(12) United States Patent
Liu et al.

(10) Patent No.: US 10,658,891 B2
(45) Date of Patent: May 19, 2020

(54) MOTOR

(71) Applicant: Danfoss (Tianjin) Ltd., Tianjin (CN)

(72) Inventors: Wanzhen Liu, Tianjin (CN); Li Yao, Tianjin (CN); Yan Lin, Tianjin (CN); Guangqiang Liu, Tianjin (CN); Zhenyu Wang, Tianjin (CN); Meng Wang, Tianjin (CN); Weiping Tang, Tianjin (CN)

(73) Assignee: DANFOSS (TIANJIN), LTD., Tianjin (CN)

( * ) Notice: Subject to any disclaimer, the term of this patent is extended or adjusted under 35 U.S.C. 154(b) by 197 days.

(21) Appl. No.: 15/392,083

(22) Filed: Dec. 28, 2016

(65) Prior Publication Data

US 2017/0187257 A1    Jun. 29, 2017

(30) Foreign Application Priority Data

Dec. 29, 2015    (CN) .......................... 2015 1 1022730

(51) Int. Cl.
| | |
|---|---|
| *H02K 1/27* | (2006.01) |
| *H02K 1/02* | (2006.01) |
| *H02K 1/14* | (2006.01) |
| *H02K 21/16* | (2006.01) |
| *H02K 1/24* | (2006.01) |

(52) U.S. Cl.
CPC ............... *H02K 1/272* (2013.01); *H02K 1/02* (2013.01); *H02K 1/146* (2013.01); *H02K 1/2766* (2013.01); *H02K 21/16* (2013.01); *H02K 1/246* (2013.01); *H02K 2213/03* (2013.01)

(58) Field of Classification Search
CPC .......... H02K 1/272; H02K 1/02; H02K 1/146; H02K 1/2766; H02K 1/246; H02K 21/16; H02K 2213/03
See application file for complete search history.

(56) References Cited

U.S. PATENT DOCUMENTS

| | | |
|---|---|---|
| 4,179,635 A | 12/1979 | Beerman |
| 4,475,052 A | 10/1984 | Okamoto et al. |
| 4,843,269 A | 6/1989 | Shramo |
| 8,138,648 B2 | 3/2012 | Wong et al. |

(Continued)

FOREIGN PATENT DOCUMENTS

| | | |
|---|---|---|
| CN | 101247055 A | 8/2008 |
| CN | 101427444 A | 5/2009 |

(Continued)

OTHER PUBLICATIONS

First Examination Report for Indian Serial No. 201614044344 dated Dec. 24, 2019.

*Primary Examiner* — Jue Zhang
(74) *Attorney, Agent, or Firm* — McCormick, Paulding & Huber PLLC

(57) ABSTRACT

Embodiments describe a motor. The motor includes a stator, and a rotor, which is arranged within the stator. An end part of at least one air-gap slot of the rotor has an offset with a predetermined distance and/or a predetermined angle relative to a main body part adjacent immediately to the end part. With the offset of a predetermined distance and/or a predetermined angle configured at the end part of at least one air-gap slot of the rotor, ripple torque of the motor is effectively lower down while complexity of the motor, stator or rotor will not be increased.

20 Claims, 19 Drawing Sheets

(56) References Cited

U.S. PATENT DOCUMENTS

| | | | |
|---|---|---|---|
| 9,124,144 B2 | 9/2015 | Prucher | |
| 2008/0007131 A1* | 1/2008 | Cai | H02K 1/2766 |
| | | | 310/156.38 |
| 2009/0228149 A1* | 9/2009 | Alston | F04B 35/00 |
| | | | 700/276 |
| 2010/0001608 A1* | 1/2010 | Kolehmainen | H02K 1/246 |
| | | | 310/156.78 |
| 2010/0181864 A1* | 7/2010 | Miura | H02K 1/2766 |
| | | | 310/216.094 |
| 2010/0194232 A1 | 8/2010 | Wu | |
| 2013/0147299 A1* | 6/2013 | Rahman | H02K 1/2706 |
| | | | 310/156.01 |
| 2015/0303749 A1* | 10/2015 | Okubo | H02K 29/03 |
| | | | 310/156.38 |

FOREIGN PATENT DOCUMENTS

| | | |
|---|---|---|
| CN | 101465586 A | 6/2009 |
| CN | 102355072 A | 2/2012 |
| CN | 102664475 A | 9/2012 |
| CN | 103269136 A | 8/2013 |
| CN | 103296803 A | 9/2013 |
| CN | 205566051 U | 9/2016 |
| JP | H08-104353 A | 4/1996 |
| JP | 2000-50546 A | 2/2000 |
| JP | 2004-274808 A | 9/2004 |

* cited by examiner

MOTOR

CROSS REFERENCE TO RELATED APPLICATION

Applicant hereby claims foreign priority benefits under U.S.C. § 119 from Chinese Patent Application No. 201511022730.2 filed on Dec. 29, 2015, the content of which is incorporated by reference herein.

TECHNICAL FIELD

The present invention relates generally to a motor, and more particularly, to a permanent magnet assist synchronous reluctance motor.

BACKGROUND

An induction motor or a reluctance motor is generally used to replace a rare earth permanent magnet motor, in order to reduce costs of a variable speed motor. The induction motor will lower down motor efficiency although it can reduce the costs of the variable speed motor. The reluctance motor requires larger current, which will increase costs of a frequency converter, and thereby the total costs of the variable speed motor and the frequency converter will be increased.

In addition, as shown in FIGS. 1 and 2, there are several air-gap slots 21 arranged on the rotor 20 of the existing reluctance motor. Each air-gap slot 21 has an end part 21a, and a main body part 21b which is immediately adjacent to the end part 21a. As shown in FIGS. 1 and 2, the end part 21a of the air-gap slot 21 and the main body part 21b corresponding to the end part 21a are aligned with each other, which will greatly limit optimization of motor design and will make it impossible to further reduce torque ripple of the reluctance motor.

Non-uniform air gaps are generally used in order to reduce the torque ripple of a motor. Even though the non-uniform air gap can reduce the torque ripple of the motor, it will increase the complexity of a stator or rotor of the motor, and it is hard to measure the air gap of the motor.

SUMMARY

In view of the above, in an aspect, a motor is provided, whose ripple torque is effectively reduced while whose rotor's or stator's complexity is not increased.

In another aspect, a motor is provided, which can enable effective decrease in costs of a variable-speed motor and can have a higher efficiency.

In an aspect, a motor includes a stator, and a rotor, which is arranged within the stator; an end part of at least one air-gap slot of the rotor has an offset with a predetermined distance and/or a predetermined angle relative to a main body part adjacent immediately to the end part.

In an exemplary embodiment, the rotor includes multiple groups of air-gap slots, the multiple groups being separately distributed around a center of the rotor; each group of air-gap slots includes multiple air-gap slots which are arranged separately along a radial direction of the rotor.

In an exemplary embodiment, at least one end part of at least one air-gap slot in said each group of air-gap slots has the offset with the predetermined distance and/or the predetermined angle relative to a main body part of the at least one air-gap slot.

In an exemplary embodiment, end parts of any air-gap slot in said each group of air-gap slots, except for an air-gap slot located at the outmost in the radial direction of the rotor, have an offset with a predetermined distance and/or a predetermined angle relative to a corresponding main body part of said any air-gap slot.

In an exemplary embodiment, the at least one end part of the at least one air-gap slot in said each group of air-gap slots has the offset in a direction towards or away from an adjacent group of air-gap slots.

In an exemplary embodiment, the at least one air-gap slot is approximately U-shaped, V-shaped or circular arc-shaped; or, each air-gap slot in each group of air-gap slots has a same shape or different shapes; or, the rotor includes four, six or eight groups of air-gap slots; or, said each group of air-gap slots includes two or three air-gap slots, the two or three air-gap slots being separately arranged along the radial direction of the rotor.

In an exemplary embodiment, a first end part of a first air-gap slot in said each group of air-gap slots has an offset distance or angle equal to or different from an offset distance or angle that a second end part of a second air-gap slot in said each group of air-gap slots; or, the first end part of the first air-gap slot in said each group of air-gap slots has an offset direction the same as or different from an offset direction that the second end part of the second air-gap slot in said each group of air-gap slots; or, two end parts of a same air-gap slot have a same offset distance or angle, or different offset distances or angles; or, the two end parts of the same air-gap slot have a same offset direction or different offset directions; or, two adjacent groups of air-gap slots are symmetrical or asymmetrical to each other; or, an end part of an air-gap slot in one of the two adjacent groups has an offset distance or angle the same as or different from an offset distance or angle that a corresponding end part of a corresponding air-gap slot in the other of the two adjacent groups has; or, the end part of the air-gap slot in one of the two adjacent groups has an offset direction the same as or different from an offset direction that the corresponding end part of the corresponding air-gap slot in the other of the two adjacent groups has.

In an exemplary embodiment, the end part of the at least one air-gap slot is connected with the main body part adjacent immediately to the end part or is spaced apart by a predetermined distance from the main body part adjacent immediately to the end part; where the predetermined distance is more than or equal to 0.5 mm and less than or equal to 0.8 mm.

In an exemplary embodiment, the main body part adjacent immediately to the end part of the at least one air-gap slot extends along an arc-shaped line, and the end part has the offset with the predetermined distance and/or predetermined angle relative to a tangent line of an edge part of the arc-shaped line of the main body part adjacent immediately to the end part.

In an exemplary embodiment, a distance (W) between respective vertexes of two end parts of respective innermost air-gap slots in two adjacent groups of air-gap slots, a radius (R) of the rotor and the number (2p) of said groups of air-gap slots meet a relation:

$$0.065 \leq W/(2\pi R/2p) \leq 0.09.$$

In an exemplary embodiment, the maximum electrical degree θ of an included angle between a first line and a second line meets a relation of 124°≤θ≤140°, where the first line is between a center point of an end part of a magnetic flux path of the rotor and an axial center point of the rotor, and the second line is between a center point of the other end part of the magnetic flux path of the rotor and the axial center point of the rotor.

In an exemplary embodiment, magnetic filler is filled in at least one air-gap slot of the rotor.

In an exemplary embodiment, one or more pieces of the magnetic filler is/are filled in a same air-gap slot.

In an exemplary embodiment, the magnetic filler is a ferrite magnet containing a rare earth element and/or sintered neodymium-iron-boron permanent magnet.

In an exemplary embodiment, the motor is a motor applicable to a variable speed compressor.

DETAILED DESCRIPTION

The present invention will be further described below with reference to the accompanying drawings and specific embodiments. The same or similar reference signs in the description indicate the same or similar parts. The following description of the embodiments of the present invention with reference to the accompanying drawings is intended to explain the general inventive concept of the present invention, but should not be construed as a limitation of the present invention.

In addition, specific details are described in the following detailed description in order to enable a comprehensive understanding of the embodiments. It is obvious, however, that one or more embodiments may be implemented without these specific details. In other instances, some conventional structures and devices are shown in the schematic diagrams to simplify the drawings.

Embodiment 1

Figure 1:
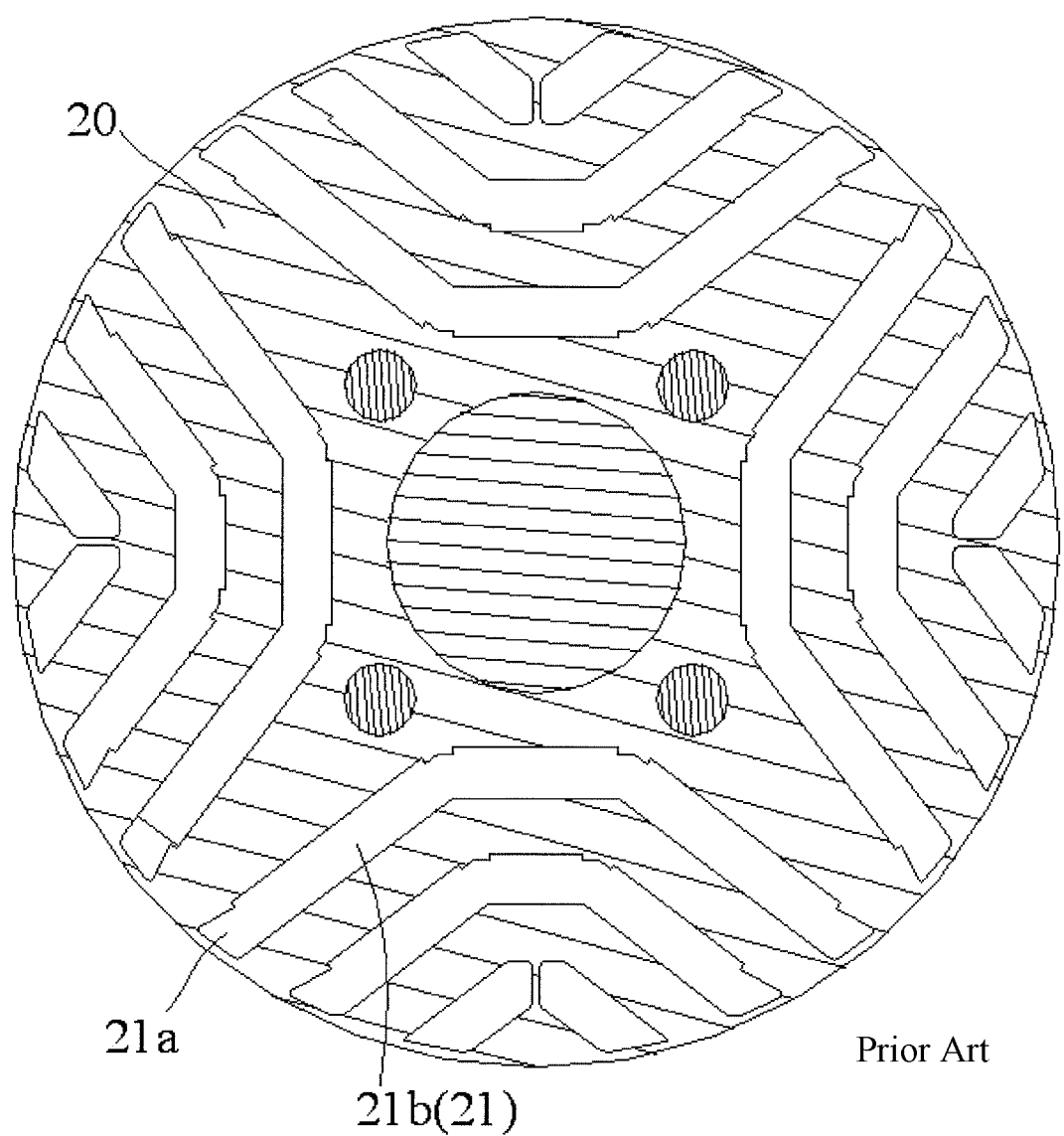
FIG. 1 shows a schematic diagram of a rotor of a reluctance motor in the prior art, where no magnetic fillers are filled in air-gap slots of the rotor.
Figure 2:
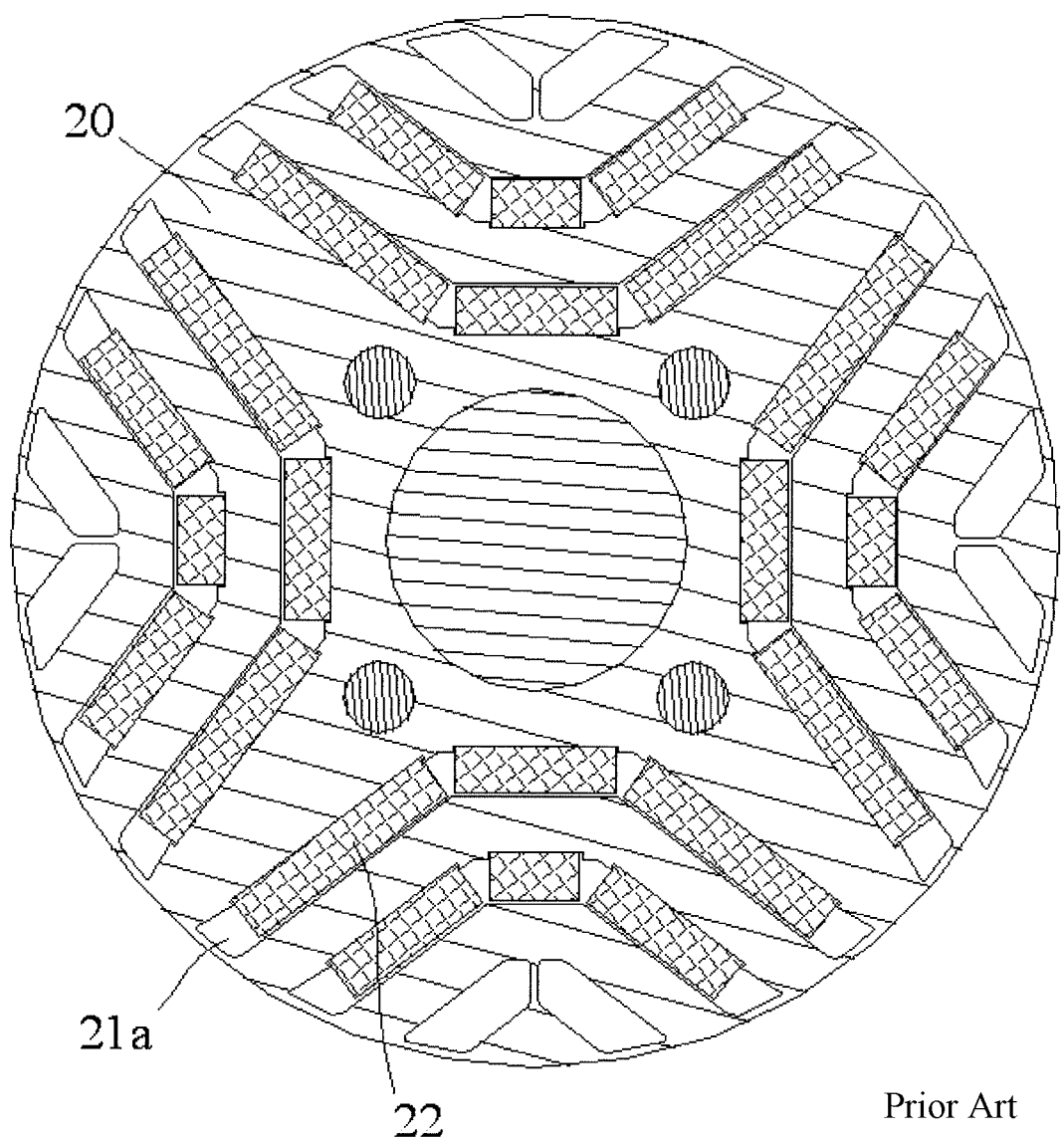
FIG. 2 shows a schematic diagram of the rotor of the reluctance motor in the prior art, where magnetic fillers are filled in the air-gap slots of the rotor.
Figure 3:
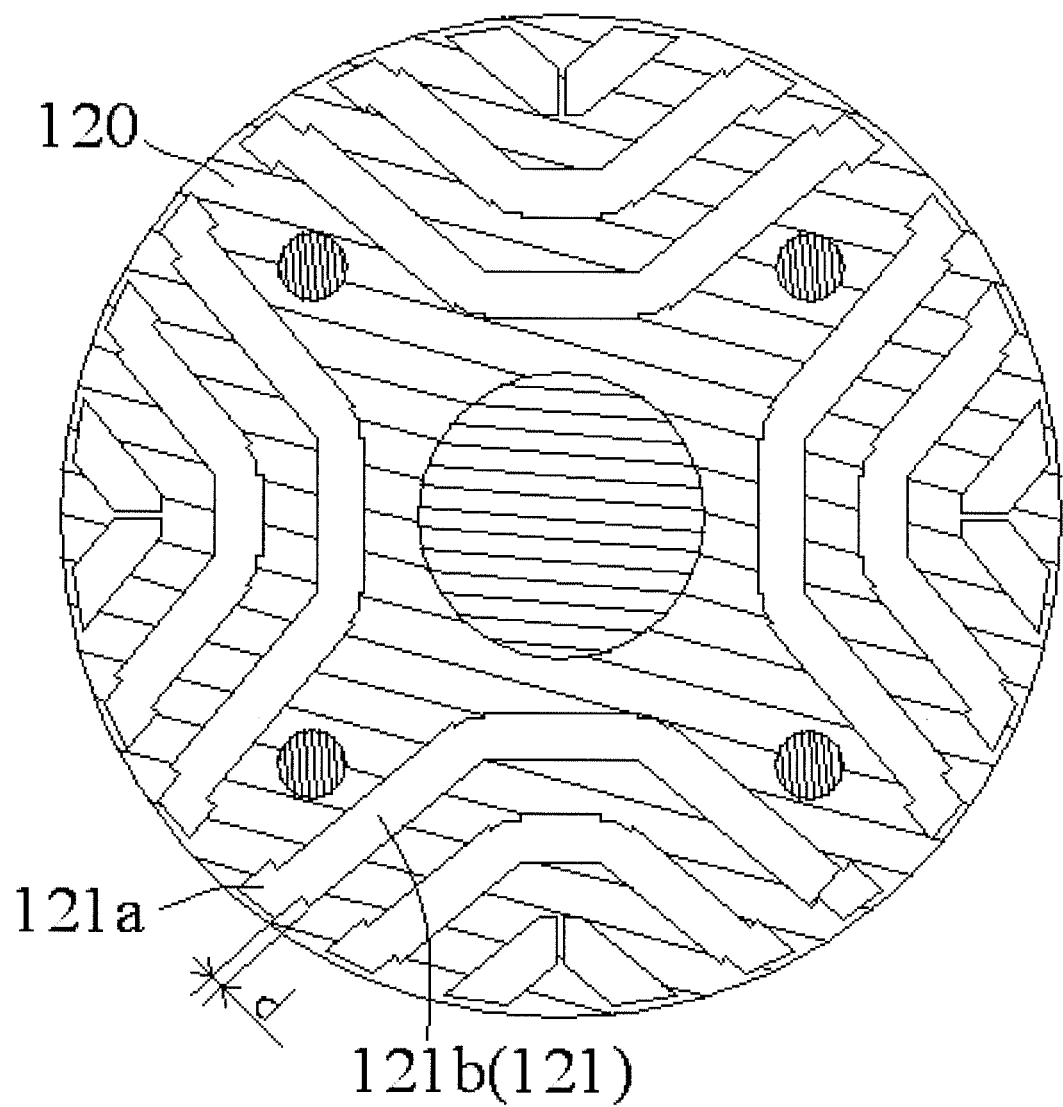
FIG. 3 shows a schematic diagram of a rotor of a reluctance motor according to a first embodiment of the present invention, where no magnetic fillers are filled in air-gap slots of the rotor.
Figure 4:
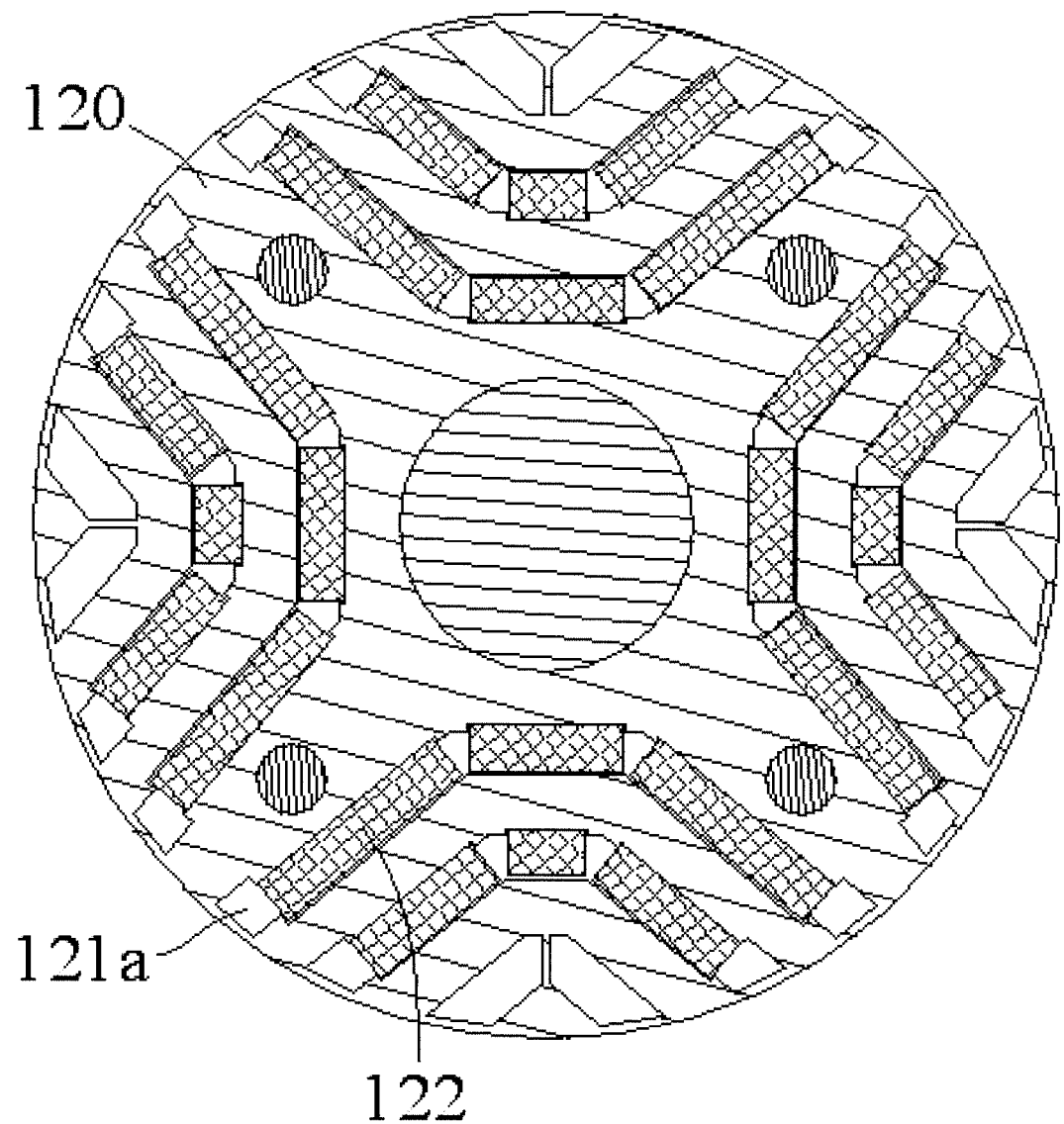
FIG. 4 shows a schematic diagram of the rotor of the reluctance motor according to the first embodiment of the present invention, where magnetic filler is filled in the air-gap slots of the rotor.
Figure 5:
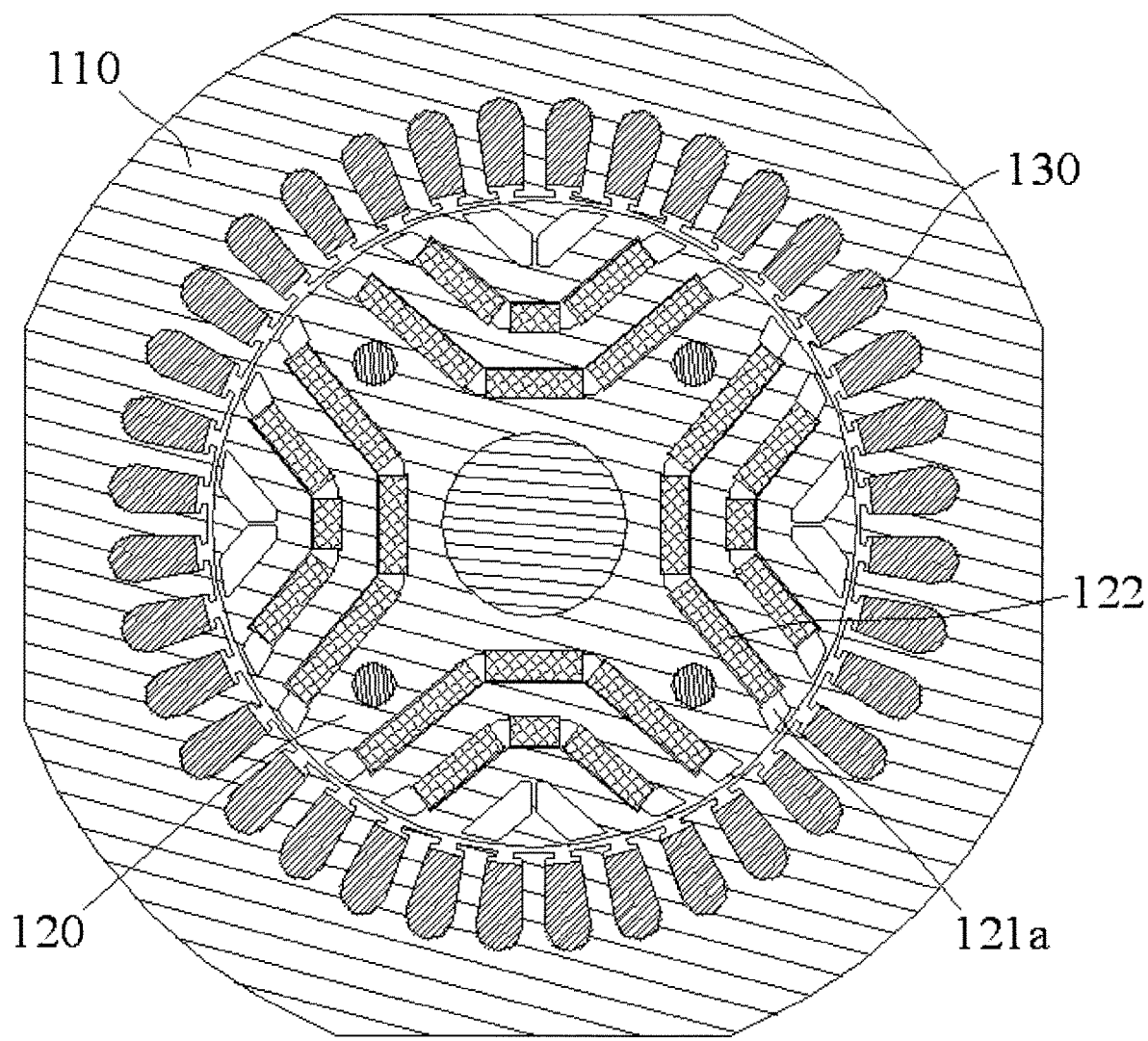
FIG. 5 shows a schematic diagram of the reluctance motor according to the first embodiment of the present invention.

FIG. 3 shows a schematic diagram of a rotor 120 of a reluctance motor according to a first embodiment of the present invention, where no magnetic filler 122 is filled in air-gap slots 121 of the rotor 120; FIG. 4 shows a schematic diagram of the rotor 120 of the reluctance motor according to the first embodiment of the present invention, where the magnetic filler 122 is filled in the air-gap slots 121 of the rotor 120; FIG. 5 shows a schematic diagram of the reluctance motor according to the first embodiment of the present invention.

In an exemplary embodiment of the present invention, the reluctance motor is provided. As shown in FIG. 5, the reluctance motor mainly includes a stator 110, a rotor 120 and a coil 130. The rotor 120 is configured within a containing chamber of the stator 110, and the coil 130 is configured within a coil slot in a side wall of the containing chamber of the stator 110.

As shown in FIG. 3, in the illustrated embodiment, end parts at least one air-gap slot 121 of the rotor 120 has end parts 121a which have an offset of a predetermined distanced from a main body part 121b adjacent immediately to the end parts 121a.

In the embodiment shown in FIGS. 3 and 4, the rotor 120 includes four groups of air-gap slots which are distributed separately around the center of the rotor 120, and each group of air-gap slots includes three air-gap slots which are separately arranged along a radial direction of the rotor. It should be noted, however, that the present invention should not be limited to the illustrated embodiment, the rotor may include four, six, eight or more groups of air-gap slots, and each group of air-gap slots may include two, four or more air-gap slots.

In the embodiment shown in FIGS. 3 and 4, end parts except for the outmost air-gap slot in each group of air-gap slots, end parts 121a of any of the other air-gap slots 121 in each group of air-gap slots have an offset of predetermined distanced from a main body part 121b adjacent immediately to the end parts 21a.

As shown in FIGS. 3 and 4, in the embodiment, the outmost air-gap slot in each group of air-gap slots is V-shaped as a whole, and the other air-gap slots 121 in each group of air-gap slots, except for the outmost air-gap slot, are U-shaped as a whole. In the embodiment, the outmost air-gap slot in each group of air-gap slots are disconnected in the middle and spaced apart by materials of the rotor. Thus, it can ensure sufficient mechanical strength for the rotor.

As shown in FIGS. 3 and 4, in the embodiment, the respective offset distances d at the respective end parts 121a of different air-gap slots 121 in each group of the air-gap slots are the same; the respective offset directions at the respective end parts of different air-gap slots in each group of the air-gap slots are the same, for example, a direction towards an adjacent group of air-gap slots.

As shown in FIGS. 3 and 4, in the embodiment, two adjacent groups of air-gap slots are symmetrical to each other.

As shown in FIGS. 3 and 4, in the embodiment, an end part of an air-gap slot 121 in a group of air-gap slots has the same offset distance as an offset distance that an end part of a corresponding air-gap 121 in an adjacent group of air-gap slots has.

As shown in FIGS. 3 and 4, in the embodiment, the end part of the air-gap slot 121 in a group of air-gap slots has the same offset direction as an offset direction that the end part of the corresponding air-gap 121 in the adjacent group of air-gap slots has.

As shown in FIGS. 3 and 4, in the embodiment, the end parts 121a of an air-gap slot 121 are connected with a main body part 121b adjacent immediately to the end parts 121a.

As shown in FIGS. 3 and 4, in the embodiment, the main body part 121b adjacent immediately to the end parts 121a of an air-gap slot 121 extends along a straight line.

As shown in FIGS. 3, 4 and 5, magnetic filler 122 is filled in at least one air-gap slot 121 of the rotor 120. In the embodiment, magnetic filler 122 is filled only in two inner air-gap slots 121 in each group of air-gap slots of the rotor 120.

As shown in FIGS. 3, 4 and 5, one or more magnetic filler 122 is filled in one air-gap slot 121. In an embodiment of the present invention, the magnetic filler may be a ferrite magnet containing a rare earth element and/or a sintered neodymium-iron-boron permanent magnet. The sintered neodymium-iron-boron permanent magnet with little or no Dy could be used, for example, a Dy content may be 3% or less.

In an embodiment of the present invention, the motor shown in FIGS. 3-5 could be a motor applicable to a variable-speed compressor.

Embodiment 2

Figure 6:
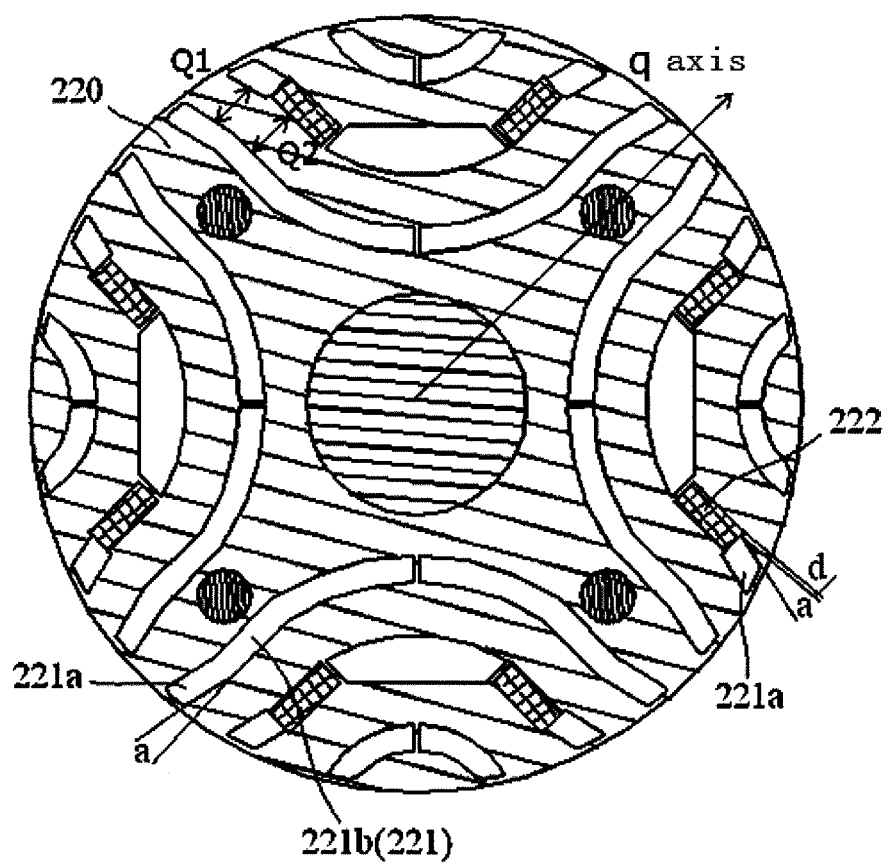
FIG. 6 shows a schematic diagram of a rotor of a reluctance motor according to a second embodiment of the present invention, where magnetic filler is filled in air-gap slots of the rotor.
Figure 7:
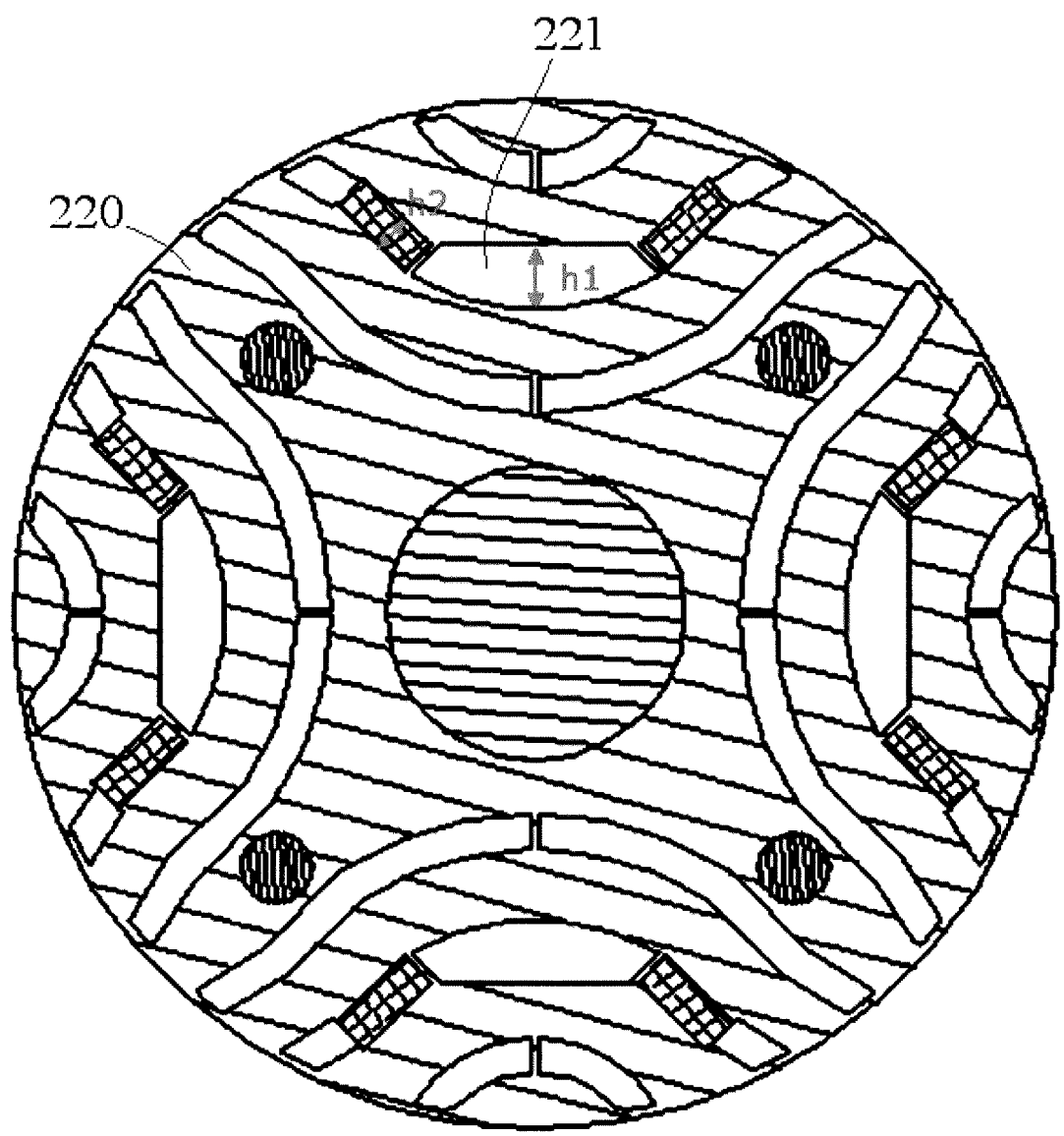
FIG. 7 shows the rotor of FIG. 6, indicating the maximum width of the middle portion of the air-gap slots in the rotor and the maximum width of side portions of the air-gap slots in the rotor.

FIG. 6 shows a schematic diagram of a rotor 220 of a reluctance motor according to a second embodiment of the present invention, where magnetic filler 222 is filled in air-gap slots 221 of the rotor 220; FIG. 7 shows the rotor of FIG. 6, indicating the maximum width of the middle portion of the air-gap slots 221 in the rotor 220 and the maximum width of side portions of the air-gap slots 221 in the rotor 220.

As shown in FIG. 6, in the embodiment, end parts 221a of at least one air-gap slot 221 of the rotor 220 have an offset with a predetermined distance d and a predetermined angle α relative to a main body part 221b adjacent immediately to the end parts 221a.

In the embodiment shown in FIGS. 6 and 7, the rotor 220 includes four groups of air-gap slots which are separately distributed around the center of the rotor 220, and each group of air-gap slots includes three air-gap slots which are separately arranged along a radial direction of the rotor.

In the embodiment shown in FIGS. 6 and 7, end parts 221a of a middle air-gap slot 221 in each group of air-gap slots have an offset with a predetermined distance d and a predetermined angle α relative to a main body part 221b adjacent immediately to the end parts 221a. In the embodiment shown in FIGS. 6 and 7, the end parts of an innermost air-gap slot in each group of air-gap slots have an offset only with a predetermined angle α, without a predetermined distance d, relative to a main body part adjacent immediately to the end parts. End parts of an outmost air-gap slot in each group of air-gap slots have no offset.

As shown in FIGS. 6 and 7, in the embodiment, the outmost air-gap slot in each group of air-gap slots is in a circular arc shape as a whole, and the other air-gap slots 221, except for the outmost air-gap slot, in each group of air-gap slots are U-shaped as a whole.

In the embodiment, as shown in FIGS. 6 and 7, the outmost air-gap slot is disconnected in its middle and the innermost air-gap slot is also disconnected in its middle, either is spaced apart by materials of the rotor. Thus, it can ensure sufficient mechanical strength for the rotor.

As shown in FIGS. 6 and 7, in the embodiment, respective end parts 221a of different air-gap slots 221 in each group of the air-gap slots have the same offset distance d and the offset angle α; the respective end parts of different air-gap slots in each group of the air-gap slots have the same offset directions, for example, towards an adjacent group of air-gap slots. After the offset, the ratio between Q1, the minimum distance between the end parts of different air-gap slots, and Q2, the distance between main body parts of different air-gap slots, should be larger than or equal to 0.95, i.e., $Q1/Q2 \geq 0.95$, in order to ensure the saturation of a magnetic path at q axis as an offset.

As shown in FIGS. 6 and 7, in the embodiment, the two adjacent groups of air-gap slots could be symmetrical to each other.

As shown in FIGS. 6 and 7, in the embodiment, corresponding end parts of two corresponding air-gap slots 221 from two adjacent groups of air-gap slots may have the same offset distance d and the same offset angles α.

As shown in FIGS. 6 and 7, in an embodiment, the corresponding end parts 221a of the two corresponding air-gap slots 221 from the two adjacent groups of air-gap slots have the same offset direction.

As shown in FIGS. 6 and 7, in an embodiment, end parts 221a of an air-gap slot 221 are connected with a main body part 221b which is adjacent immediately to the end parts 221a.

As shown in FIGS. 6 and 7, in an embodiment, a main body part 221b which is adjacent immediately to end parts 221a of an air-gap slot extend along a straight line.

As shown in FIGS. 6 and 7, magnetic filler 222 is filled in at least one air-gap slots 221 of the rotor 220. In an embodiment, magnetic filler 222 are filled only in a middle air-gap slot 221 in each group of air-gap slots of the rotor 220.

As shown in FIGS. 6 and 7, one or more pieces of magnetic fillers 222 may be filled in one air-gap slots 221, for example, two pieces of magnetic filler 222 are respectively filled in two sides of a U-shaped air-gap slot. In an embodiment of the present invention, the magnetic filler may be a ferrite magnet containing a rare earth element and/or sintered neodymium-iron-boron permanent magnet. The motor shown in FIGS. 6 and 7 may be a motor applicable to a variable-speed compressor.

As shown in FIG. 7, in an embodiment, the maximum width of the middle portion of a middle air-gap slot 221 in each group of air-gap slots of the rotor 220 is h1, and the maximum width of side portions is h2. In an embodiment of the present invention, the middle air-gap slot 221 should meet the following relation: $1.5 \leq h1/h2 \leq 2.5$. In the embodiment, magnetic filler 222 is filled only in two side portions of a middle air-gap slot 221 in each group of air-gap slots.

Embodiment 3

Figure 8:
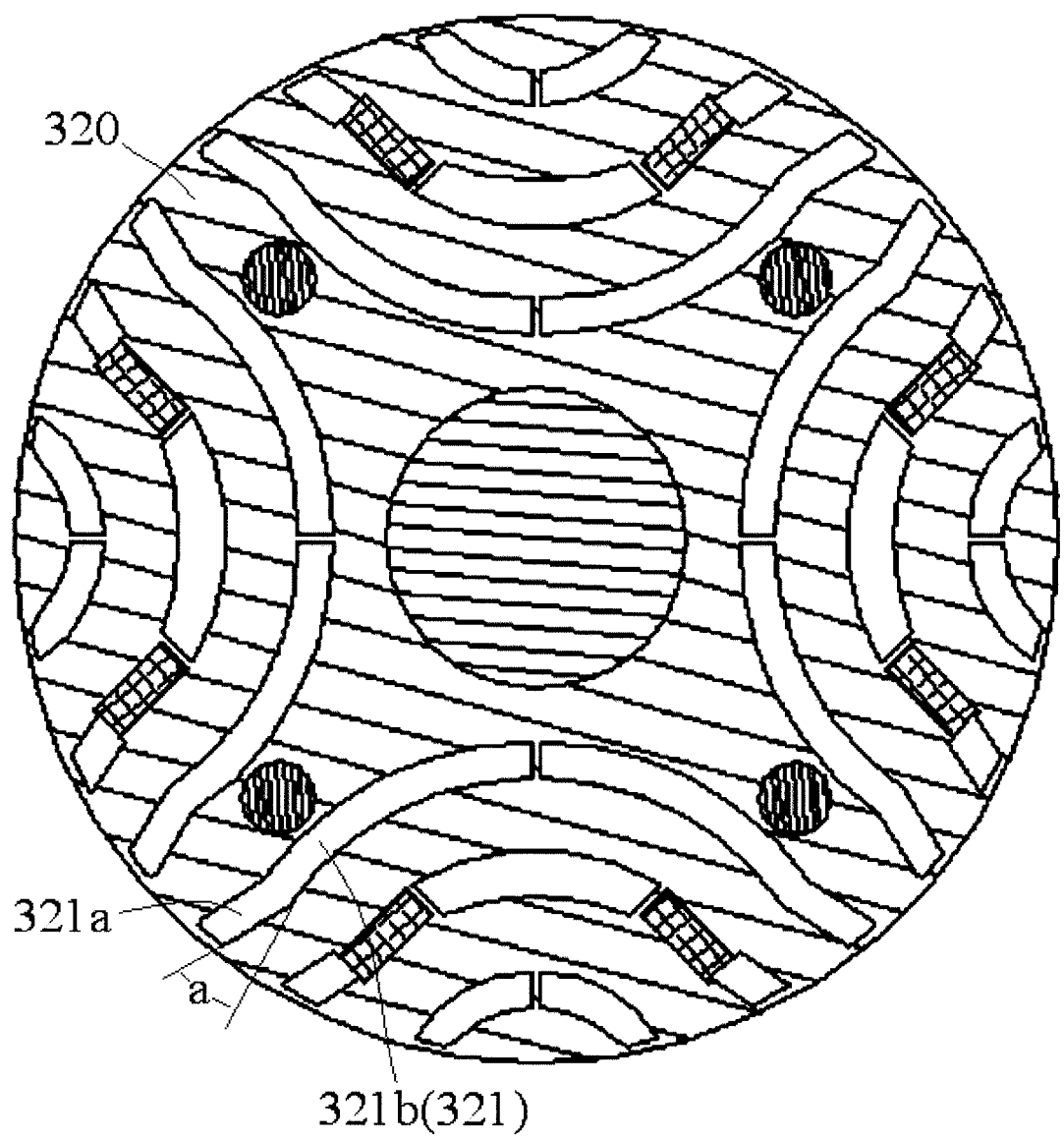
FIG. 8 shows a schematic diagram of a rotor of a reluctance motor according to a third embodiment of the present invention, where magnetic filler is filled in air-gap slots of the rotor.

FIG. 8 shows a schematic diagram of a rotor 320 of a reluctance motor according to a third embodiment of the present invention, where magnetic filler is filled in air-gap slots 321 of the rotor 320.

The third embodiment shown in FIG. 8 differs from the second embodiment shown in FIGS. 6 and 7 is the structure of an air-gap slot.

In the third embodiment shown in FIG. 8, in an innermost air-gap slot 321 in each group of air-gap slots, a main body part 321b which is immediately adjacent to end parts 321a of the innermost air-gap slot 321 extends along an arc-shaped line, and the end parts 321a have an offset with a predetermined angle α relative to a tangent line of an edge part of the arc-shaped line of the main body part 321b corresponding to the end parts 321a. Except for the above, the third embodiment shown in FIG. 8 is basically the same as the second embodiment shown in FIGS. 6 and 7.

Embodiment 4

Figure 9:
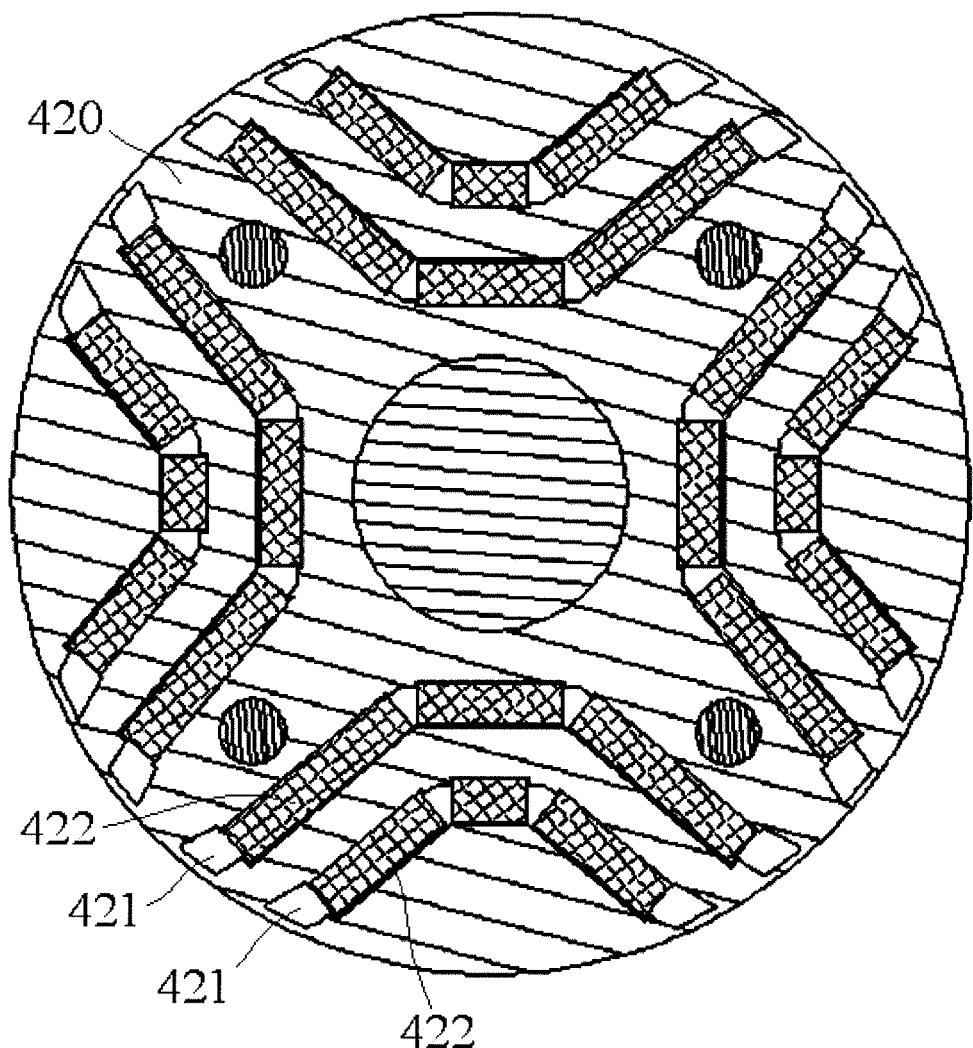
FIG. 9 shows a schematic diagram of a rotor of a reluctance motor according to a fourth embodiment of the present invention, where magnetic filler is filled in air-gap slots of the rotor.

FIG. 9 shows a schematic diagram of a rotor 420 of a reluctance motor according to a fourth embodiment of the present invention, where magnetic filler 422 is filled in air-gap slots 421 of the rotor 420.

The fourth embodiment shown in FIG. 9 differs from the first embodiment shown in FIGS. 3 and 4 in the number of air-gap slots in each group.

In the fourth embodiment shown in FIG. 9, each group of air-gap slots includes two air-gap slots 421, and magnetic fillers 422 is filled in every air-gap slot 421.

Embodiment 5

Figure 10:
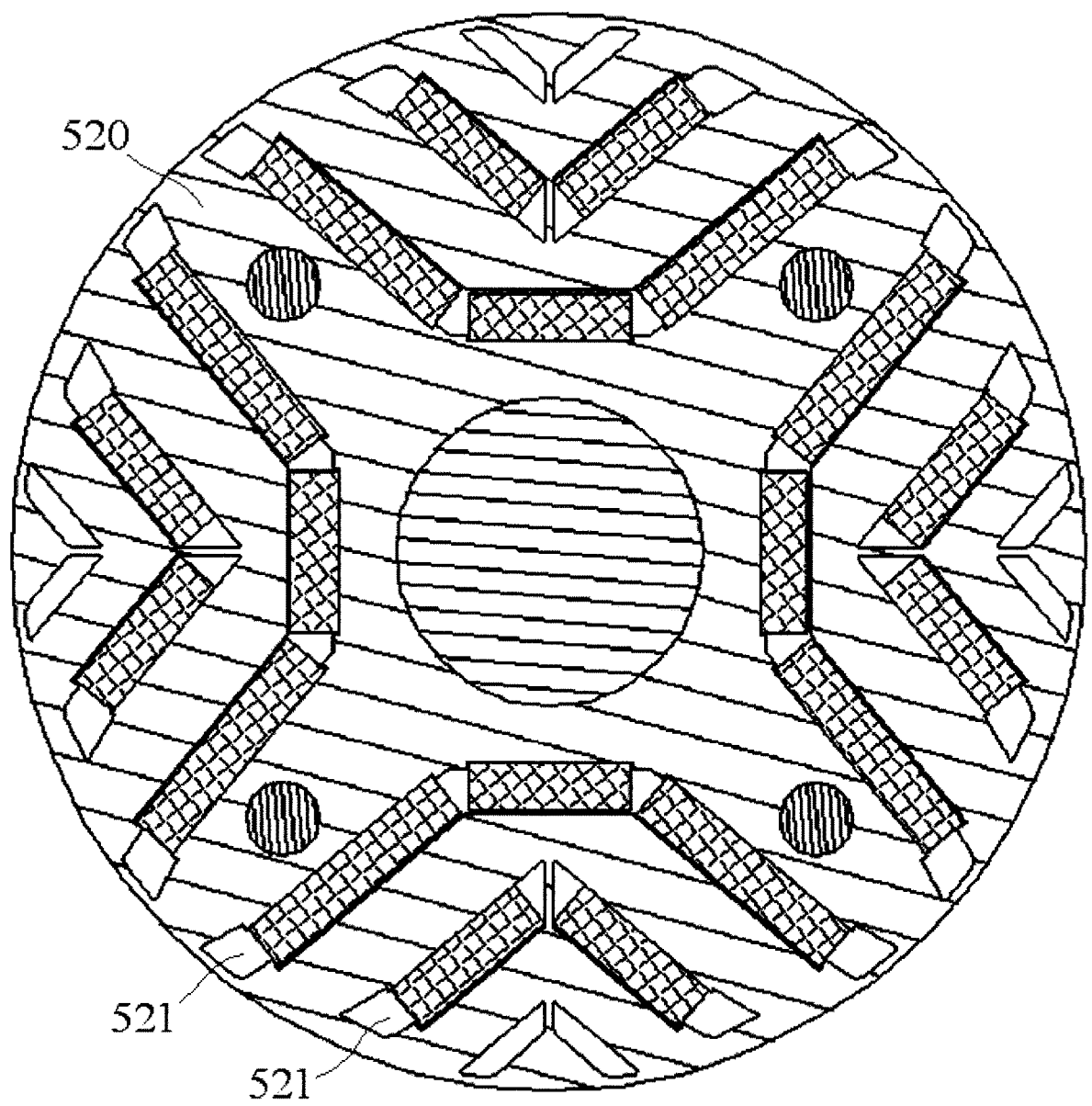
FIG. 10 shows a schematic diagram of a rotor of a reluctance motor according to a fifth embodiment of the present invention, where magnetic filler is filled in the air-gap slots of the rotor.

FIG. 10 shows a schematic diagram of a rotor 520 of a reluctance motor according to a fifth embodiment of the present invention, where magnetic filler is filled in air-gap slots 521 of the rotor 520.

The fifth embodiment shown in FIG. 10 differs from the first embodiment shown in FIGS. 3 and 4 in the structure of an air-gap slot.

In the fifth embodiment shown in FIG. 10, an outmost air-gap slot and a middle air-gap slot in each group of air-gap slots are V-shaped as a whole, and an innermost air-gap slot in each group of air-gap slots are U-shaped as a whole.

In the embodiment, as shown in FIG. 10, an air-gap slot may be disconnected in the middle, and spaced apart by the materials of the rotor. Thus, it can ensure sufficient mechanical strength for the rotor.

Embodiment 6

Figure 11:
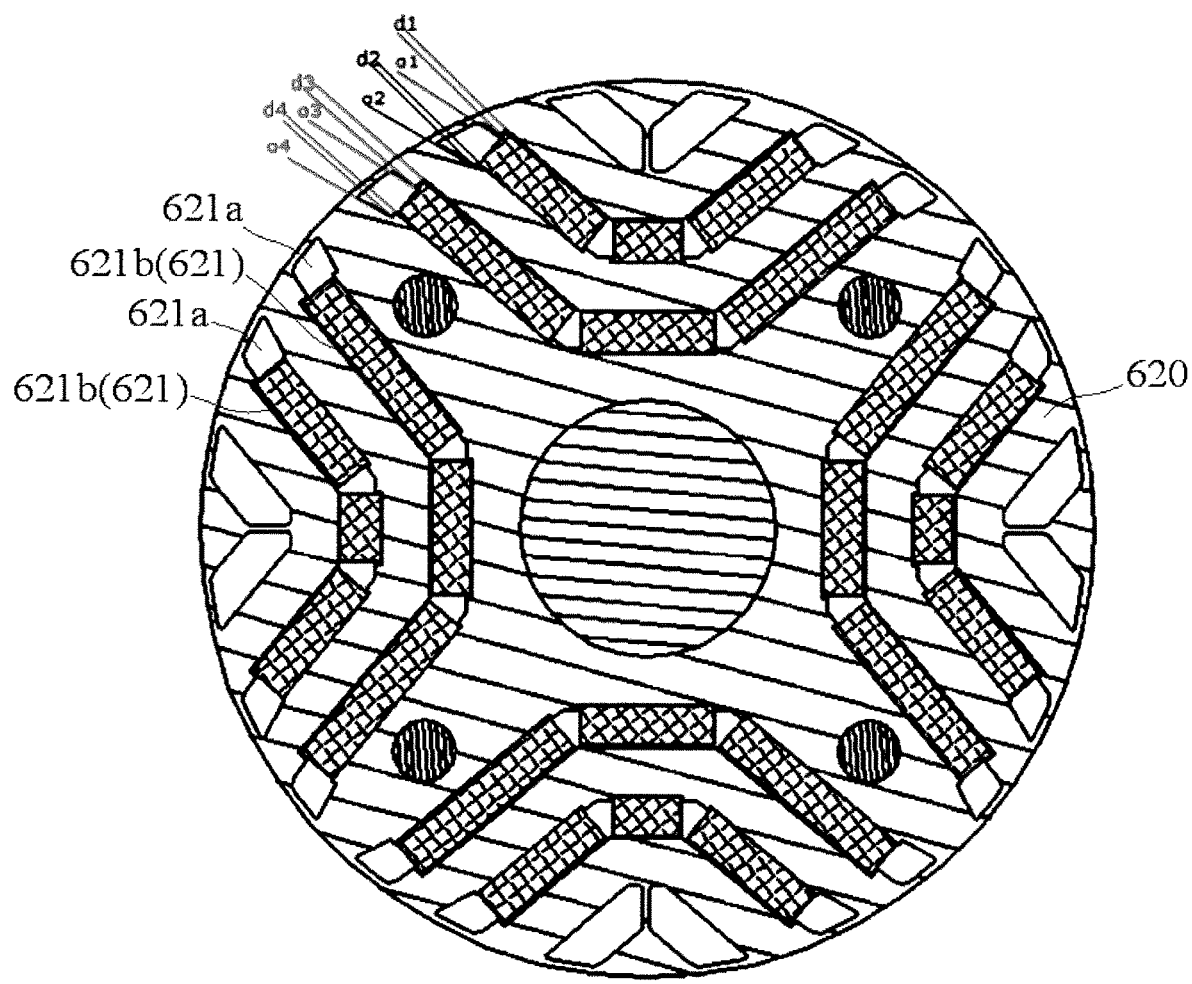
FIG. 11 shows a schematic diagram of a rotor of a reluctance motor according to a sixth embodiment of the present invention, where magnetic filler is filled in air-gap slots of the rotor.
Figure 12:
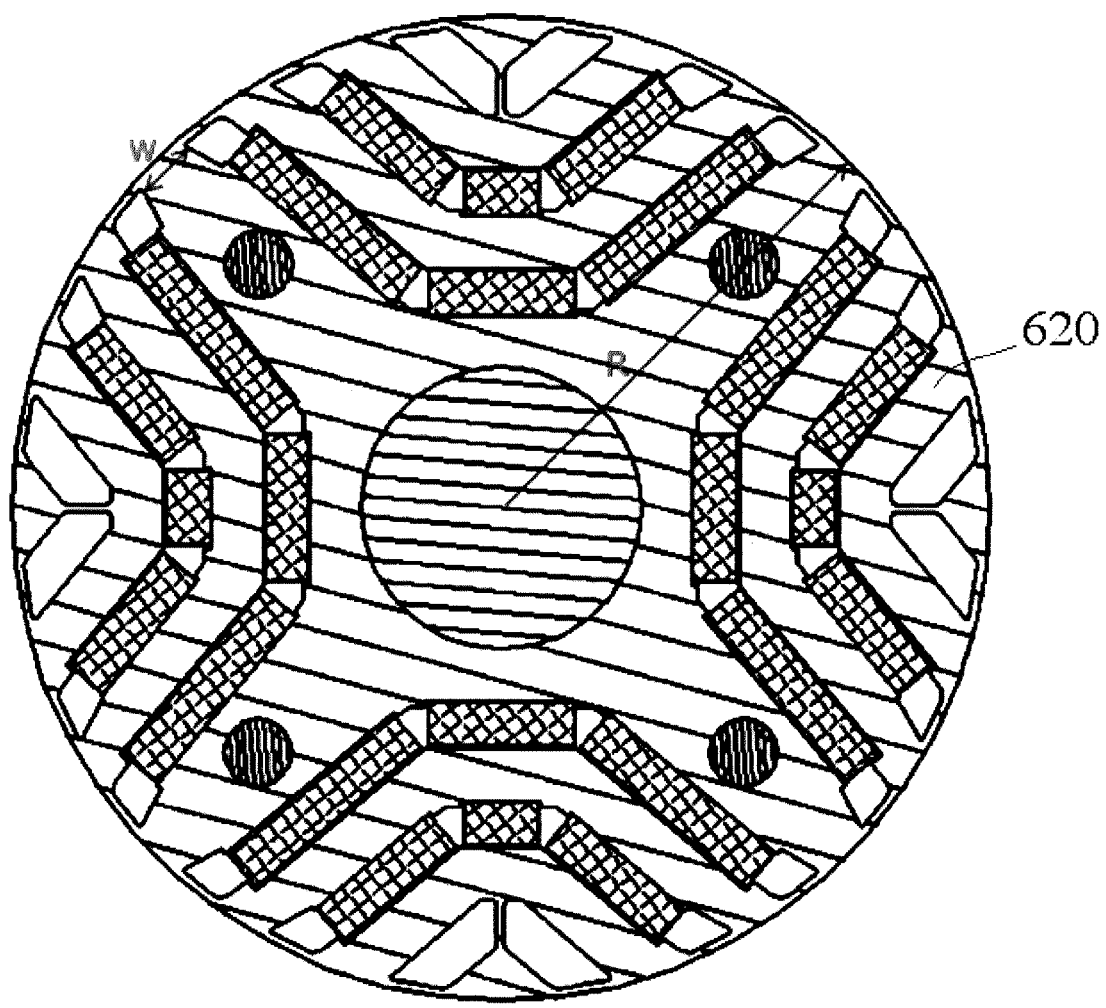
FIG. 12 shows the rotor of FIG. 11, indicating a distance between end vertexes of two closest air-gap slots, where the two closest air-gap slots respectively belong to two adjacent groups of air-gap slots, and indicating the radius of the rotor.
Figure 13:
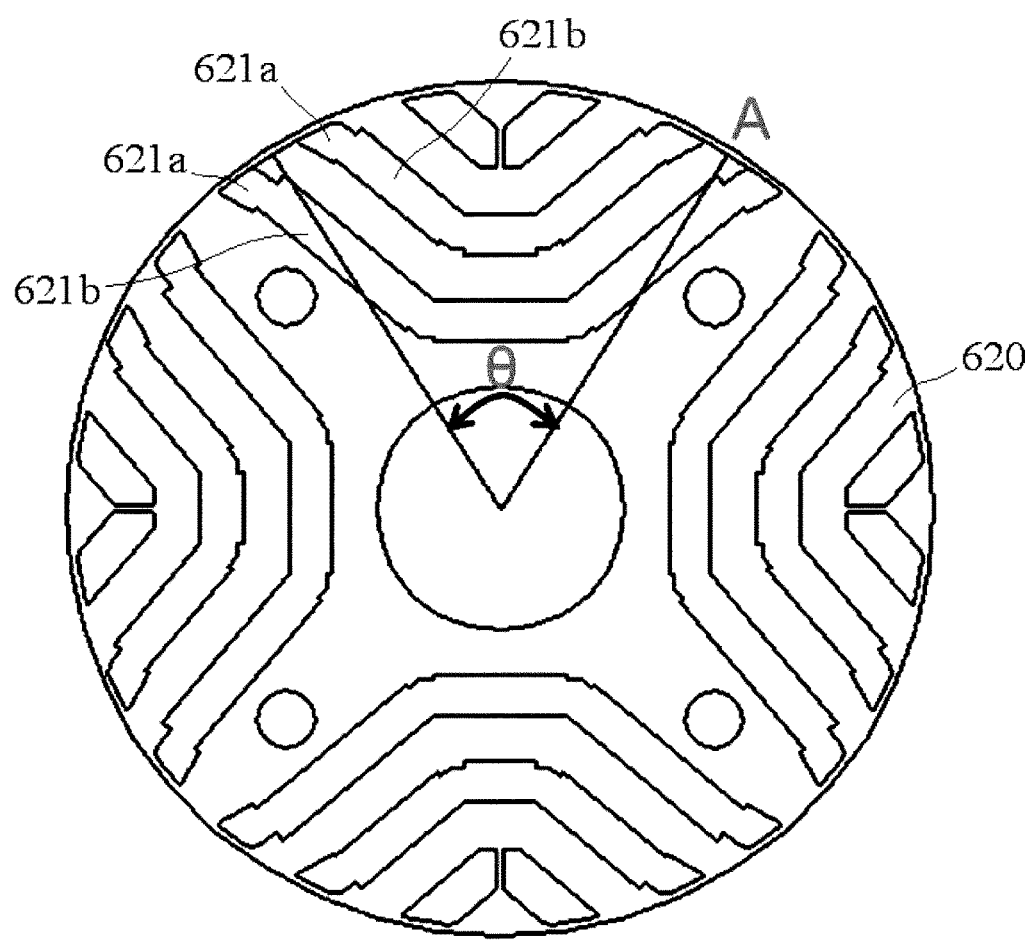
FIG. 13 shows the rotor of FIG. 11, indicating the maximum electrical degree of an included angle between a first line and a second line, where the first line is between a middle point of an end part of a magnetic flux path in the rotor and an axial point of the rotor and the second line is between a middle point of the other end part of the magnetic flux path in the rotor and the axial point of the rotor, and also indicating respective center points of the two end parts of the magnetic flux path.
Figure 14:
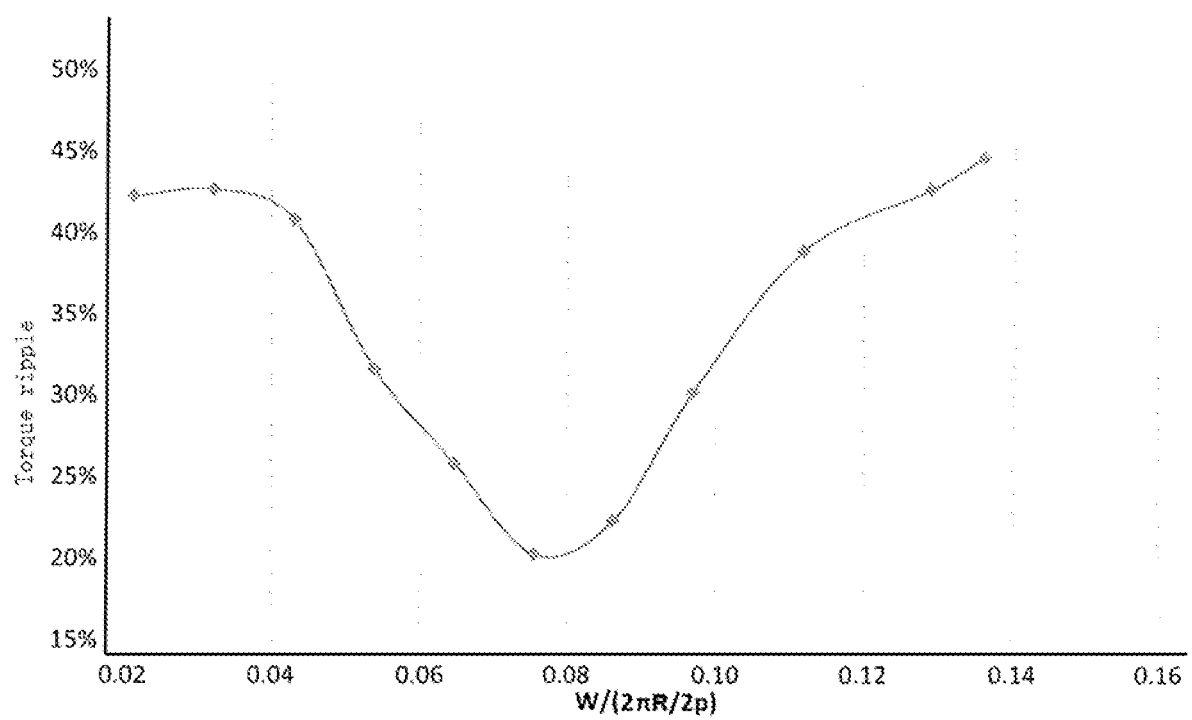
FIG. 14 shows relationship between motor torque ripple and parameters including the number of groups of air-gap slots, rotor radius and a distance between end vertexes of two closest air-gap slots, where the two closest air-gap slots respectively belong to two adjacent groups of air-gap slots.

FIG. 11 shows a schematic diagram of a rotor 620 of a reluctance motor according to a sixth embodiment of the present invention, where magnetic filler is filled in air-gap slots 621 of the rotor 620; FIG. 12 shows the rotor 620 of FIG. 11, indicating the distance W between end vertexes of two closest air-gap slots, where the two closest air-gap slots respectively belong to two adjacent groups of air-gap slots, and indicating the radius R of the rotor 620; FIG. 13 shows the rotor of FIG. 11, indicating the maximum electrical degree θ of an included angle between a first line and a second line, where the first line is between a middle point of an end part of a magnetic flux path in the rotor and an axial point of the rotor and the second line is between a middle point of the other end part of the magnetic flux path in the rotor and the axial point of the rotor, and also indicating respective center points A of the two end parts of the magnetic flux path.

The sixth embodiment shown in FIGS. 11-13 differs from the first embodiment shown in FIGS. 3 and 4 in the structure of an air-gap slot.

In the sixth embodiment shown in FIGS. 11-13, an external edge of an end part 621a of an middle air-gap slot 621 in each group of air-gap slots has an offset with a first offset distance d1 and a first offset angle α1 relative to an external edge of a main body part 621b adjacent immediately to the end part 621a, and an inner edge of the end part 621a of the middle air-gap slot 621 in each group of air-gap slots has an offset with a second offset distance d2 and a second offset angle α2 relative to an inner edge of the main body part 621b adjacent immediately to the end part 621a. An external edge of an end part 621a of an innermost air-gap slot 621 in each group of air-gap slots has an offset with a third offset distance d3 and a third offset angle α3 relative to an external edge of a main body part 621b adjacent immediately to the end part 621a of the innermost air-gap slot 621, and an inner edge of the end part 621a of the innermost air-gap slot 621 in each group of air-gap slots has an offset with a fourth offset distance d4 and a fourth offset angle α4 relative to an inner edge of the main body part 621*b* adjacent immediately to the end part 621*a* of the innermost air-gap slot 621.

In an embodiment of the present invention, the first offset distance d1 may be equal or unequal to the third offset distance d3, and the second offset distance d2 may be equal or unequal to the fourth offset distance d4. The first offset angle α1 may be equal or unequal to the third offset angle α3, and the second offset angle α2 may be equal or unequal to the fourth offset angle α4.

In an embodiment of the present invention, the first offset distance d1, the second offset distance d2, the third offset distance d3 and the fourth offset distance d4 may be equal or unequal to each other. The first offset angle α1, the second offset angle α2, the third offset angle α3 and the fourth offset angle α4 may also be equal or unequal to each other.

In an embodiment of the present invention, the above offset distances d1, d2, d3 and d4 should respectively meet the following relations: 0<d1≤0.5 mm, 0<d2≤1.5 mm, 0<d3≤1.5 mm, and 0<d4≤1.5 mm. The above offset angles α1, α2, α3 and α4 should respectively meet the following relations: 0<α1≤30°, 0<α2≤30°, 0<α3≤30°, 0<α4≤30°.

In an embodiment of the present invention, as shown in FIGS. 12 and 13, by properly designing the above offset distances d1, d2, d3, d4 and the above offset angles α1, α2, α3, α4, the distance W, the radius R and the number of air-gap slot groups 2p can meet the following relation: 0.065≤W/(2πR/2p)≤0.09; and/or the maximum electrical degree θ of the included angle can meet the following relation: 124°≤θ≤140°.

In the embodiment, respective offset directions of the above offset distances d1, d2, d3, d4 are the same, and respective offset directions of the above offset angles α1, α2, α3, α4 are the same.

Embodiment 7

Figure 15:
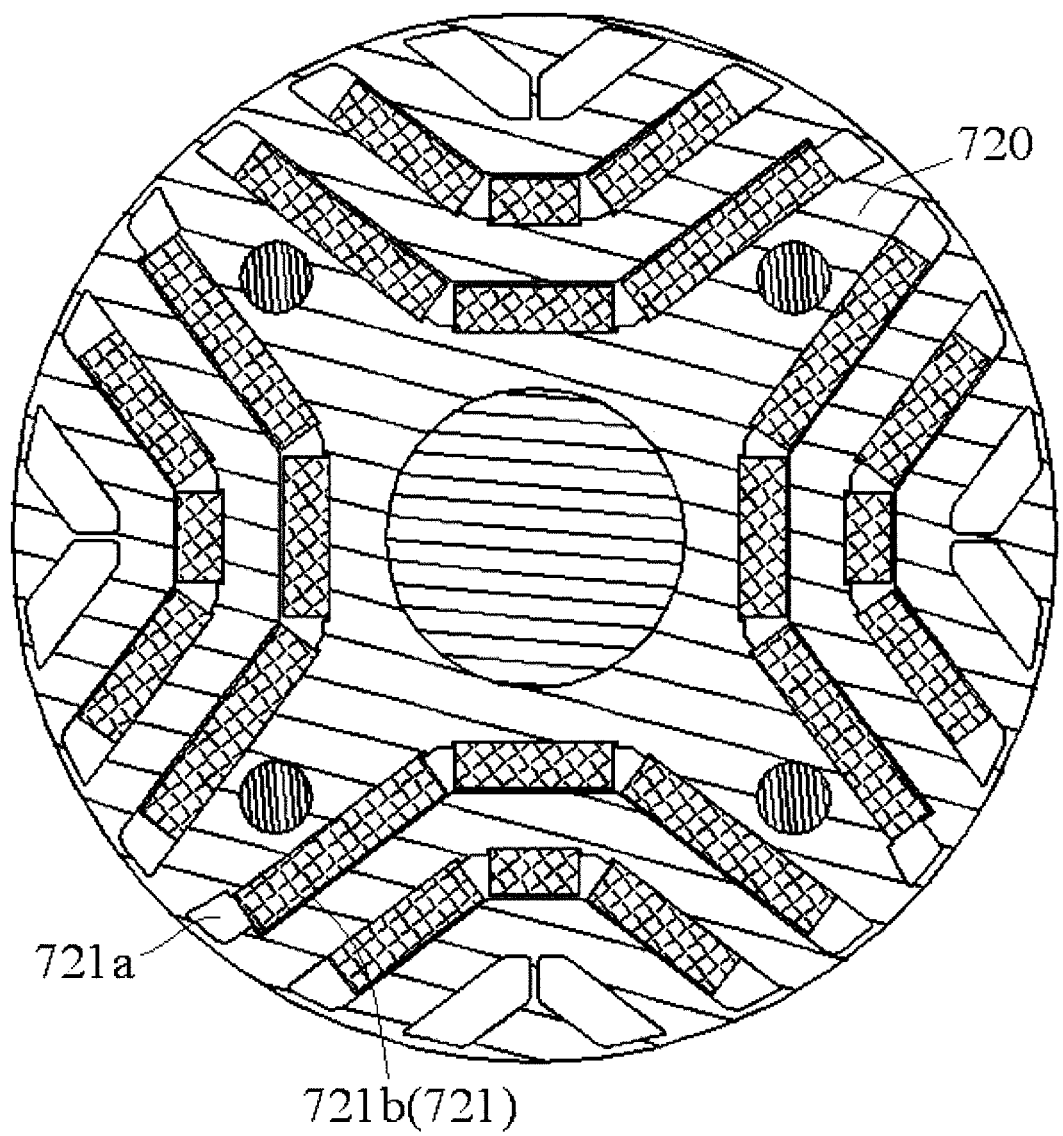
FIG. 15 shows a schematic diagram of a rotor of a reluctance motor according to a seventh embodiment of the present invention, where magnetic filler is filled in e air-gap slots of the rotor.

FIG. 15 shows a schematic diagram of a rotor 720 of a reluctance motor according to a seventh embodiment of the present invention, where magnetic filler is filled in air-gap slots 721 of the rotor 720.

The seventh embodiment shown in FIG. 15 differs from the first embodiment shown in FIGS. 3 and 4 in the structure of an air-gap slot.

In the seventh embodiment shown in FIG. 15, one of two end parts 721*a* of the innermost air-gap slots 721 has an offset with a predetermined distance and/or a predetermined angle relative to the main body part 721*b* adjacent immediately to the end part, and the other end part of the two end parts 721*a* has no offset; none of end parts of the other air-gap slots, except for the innermost air-gap slots 721, has an offset.

Embodiment 8

Figure 16:
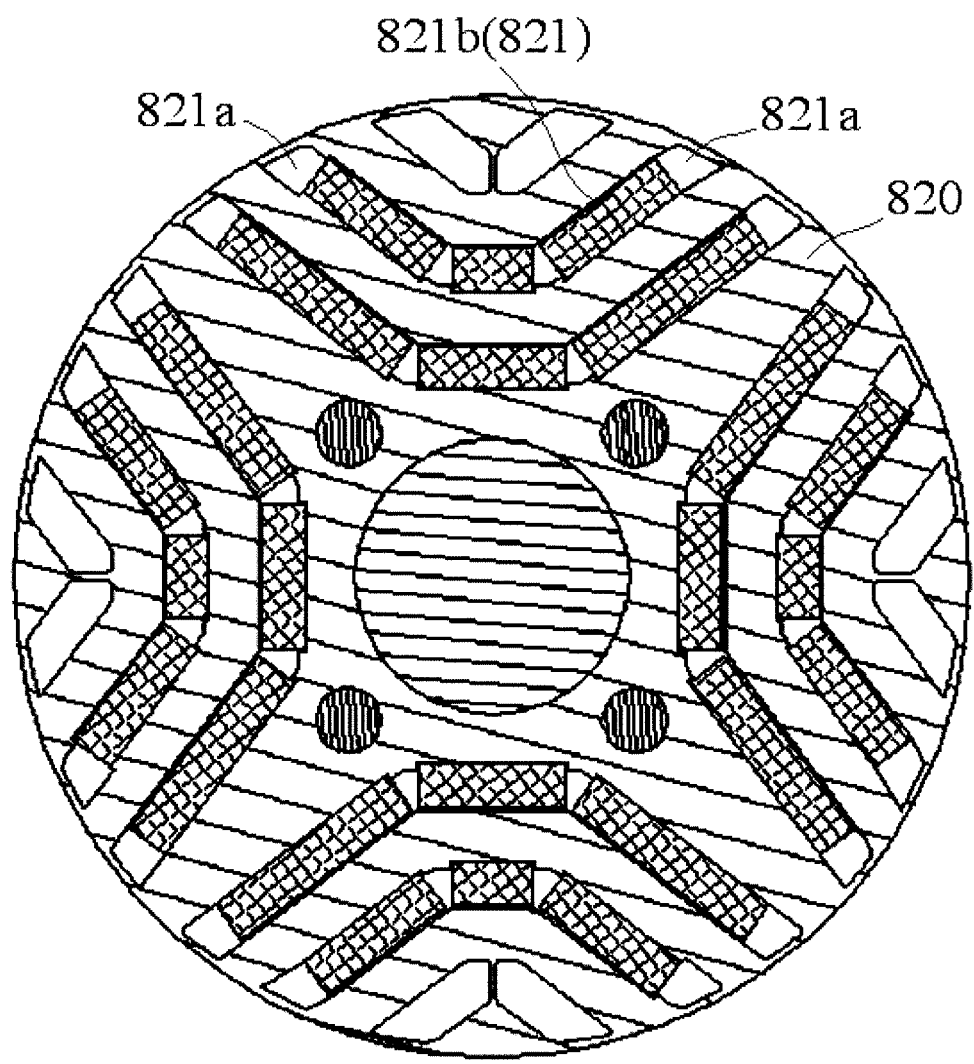
FIG. 16 shows a schematic diagram of a rotor of a reluctance motor according to an eighth embodiment of the present invention, where magnetic filler is filled in air-gap slots of the rotor.

FIG. 16 shows a schematic diagram of a rotor 820 of a reluctance motor according to an eighth embodiment of the present invention, where magnetic filler is filled in air-gap slots 821 of the rotor 820.

The eighth embodiment shown in FIG. 16 differs from the first embodiment shown in FIGS. 3 and 4 in the structure of an air-gap slot.

In the eighth embodiment shown in FIG. 16, one of two end parts 821*a* of a middle air-gap slot 821 has an offset distance and/or offset angle relative to a main body part 821*b* adjacent immediately to the end part 821*a*, and the other of the two end parts 821*a* has a different offset distance and/or offset angle. That is, the two end parts 821*a* of the middle air-gap slot 821 have different offset distances or offset angles.

Embodiment 9

Figure 17:
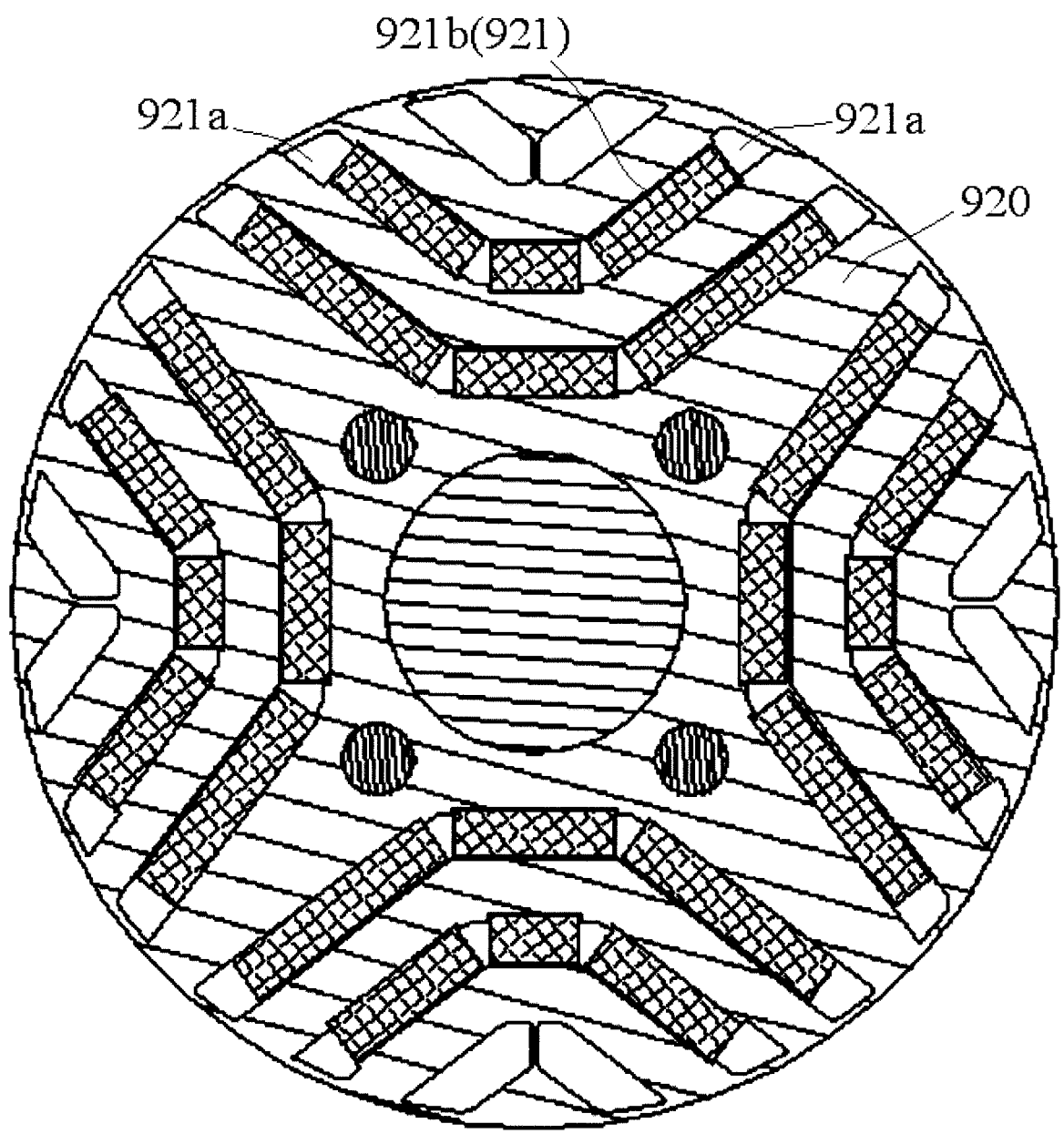
FIG. 17 shows a schematic diagram of a rotor of a reluctance motor according to a ninth embodiment of the present invention, where magnetic filler is filled in air-gap slots of the rotor.

FIG. 17 shows a schematic diagram of a rotor 920 of a reluctance motor according to a ninth embodiment of the present invention, where magnetic filler is filled in air-gap slots 921 of the rotor 920.

The ninth embodiment shown in FIG. 17 differs from the first embodiment shown in FIGS. 3 and 4 in the structure of an air-gap slot.

In the ninth embodiment shown in FIG. 17, one of two end parts 921*a* of a middle air-gap slot 921 has an offset towards the external of the rotor 920, and the other has an offset towards the internal of the rotor 920; that is, respective offset directions of the two end parts 921*a* of the middle air-gap slot 921 are different.

Embodiment 10

Figure 18:
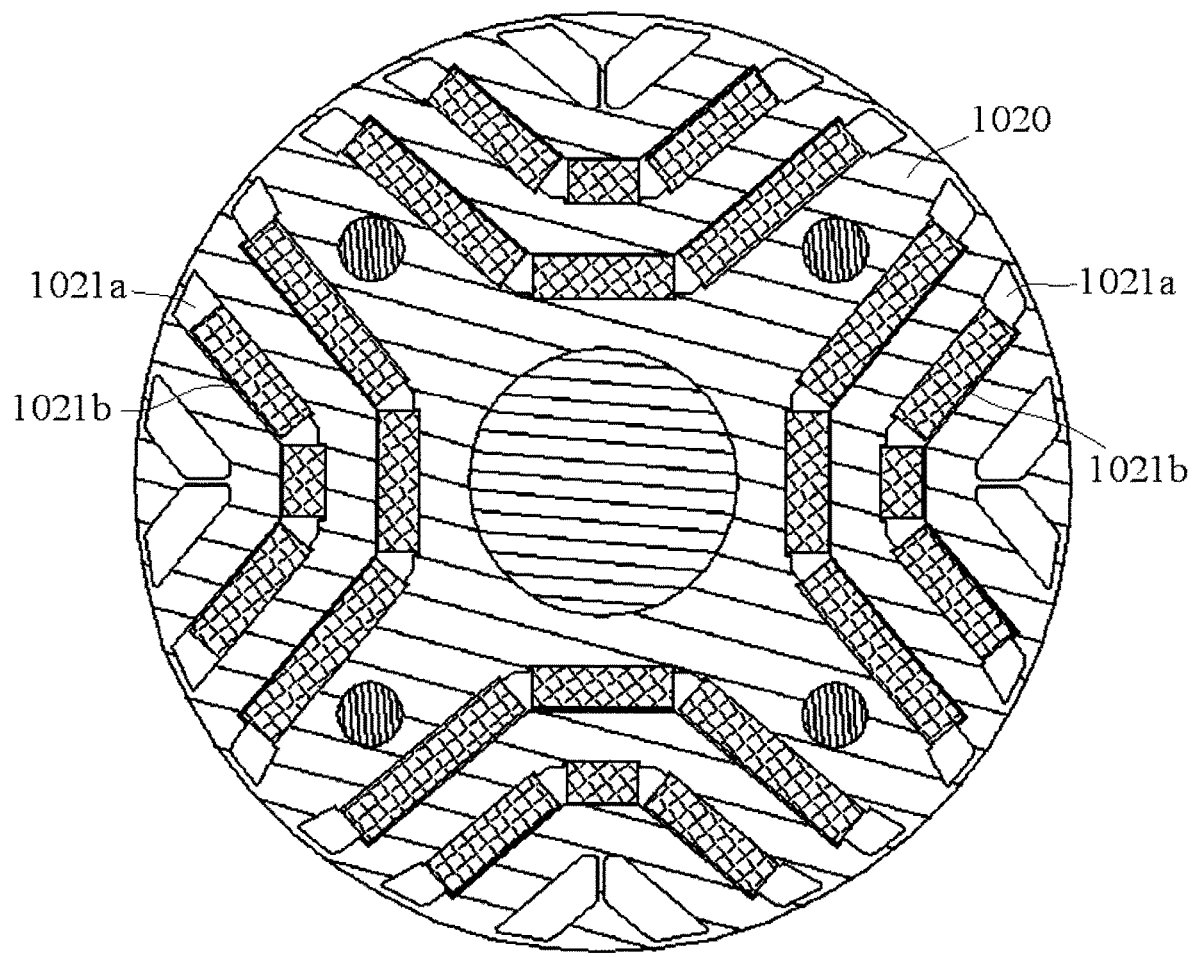
FIG. 18 shows a schematic diagram of a rotor of a reluctance motor according to a tenth embodiment of the present invention, where magnetic filler is filled in air-gap slots of the rotor.

FIG. 18 shows a schematic diagram of a rotor 1020 of a reluctance motor according to a tenth embodiment of the present invention, where magnetic filler is filled in air-gap slots 1021 of the rotor 1020.

The tenth embodiment shown in FIG. 18 differs from the first embodiment shown in FIGS. 3 and 4 in the structure of an air-gap slot.

In the tenth embodiment shown in FIG. 18, two adjacent groups of air-gap slots are asymmetrical to each other. As shown in FIG. 18, respective end parts 1021*a* of two corresponding middle air-gap slots 1021 respectively from two adjacent groups of air-gap slots have different offset distances, different offset angles and different offset directions.

Embodiment 11

Figure 19:
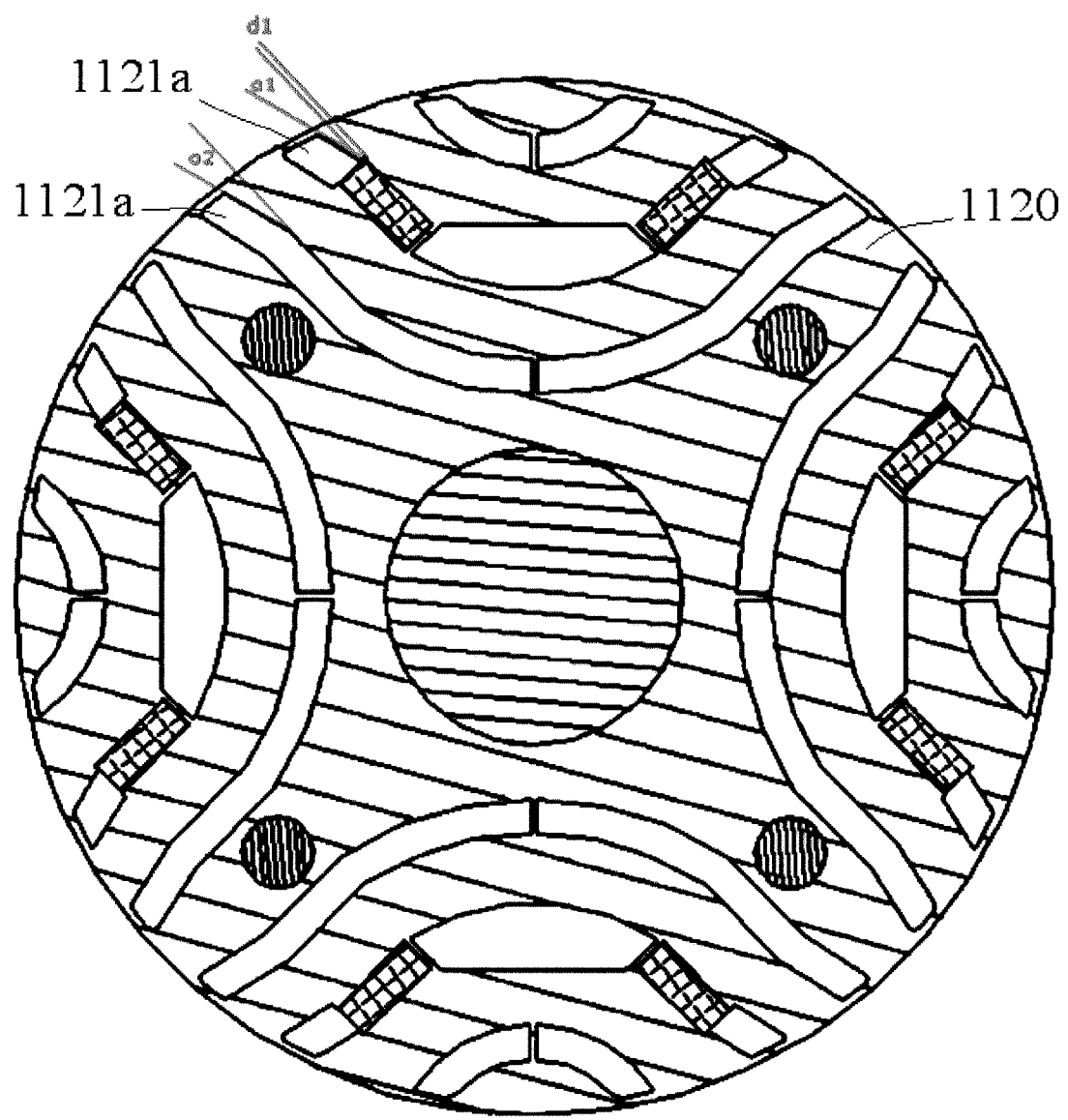
FIG. 19 shows a schematic diagram of a rotor of a reluctance motor according to an eleventh embodiment of the present invention, where magnetic filler is filled in air-gap slots of the rotor.
Figure 1:
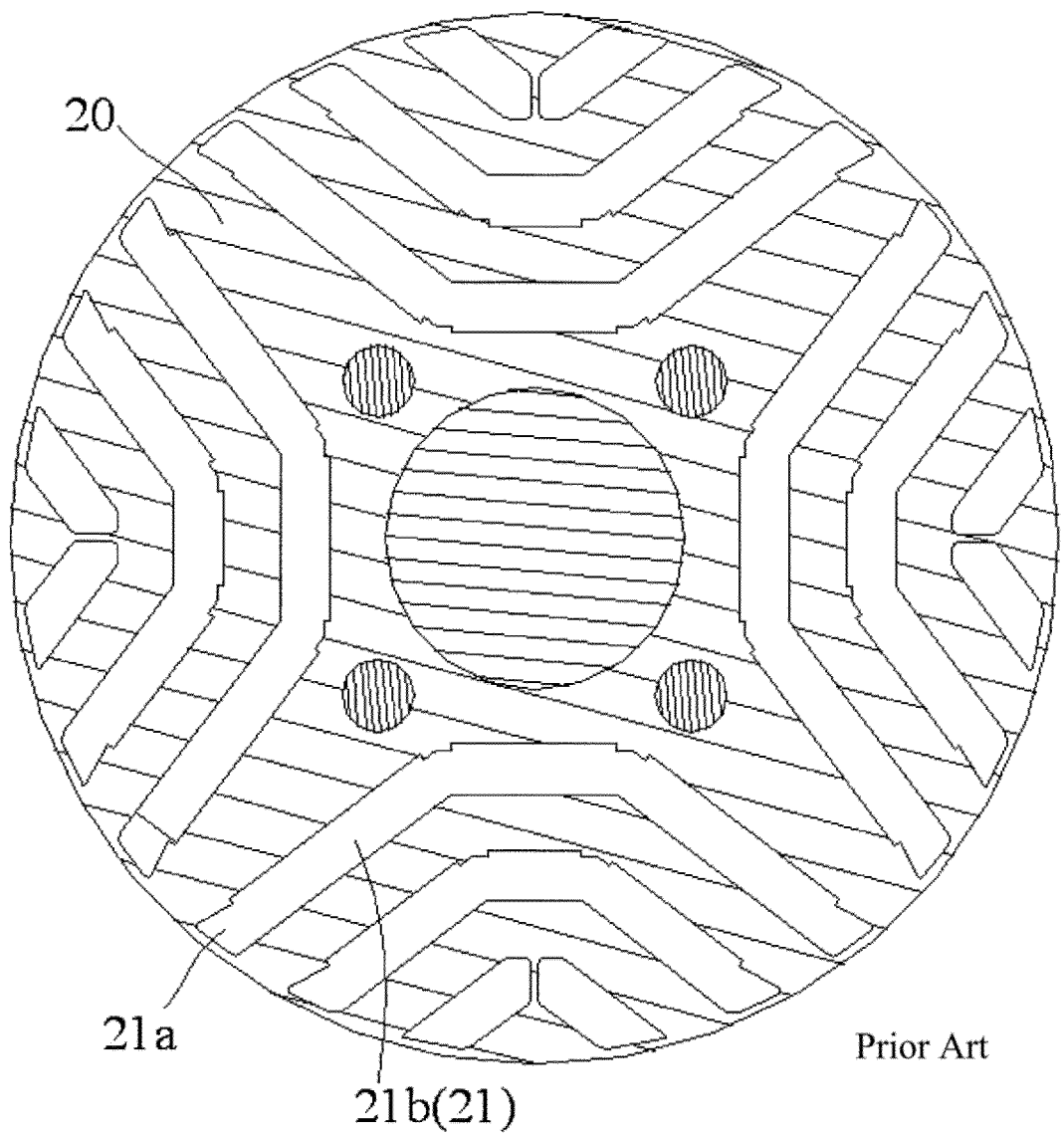
Figure 2:
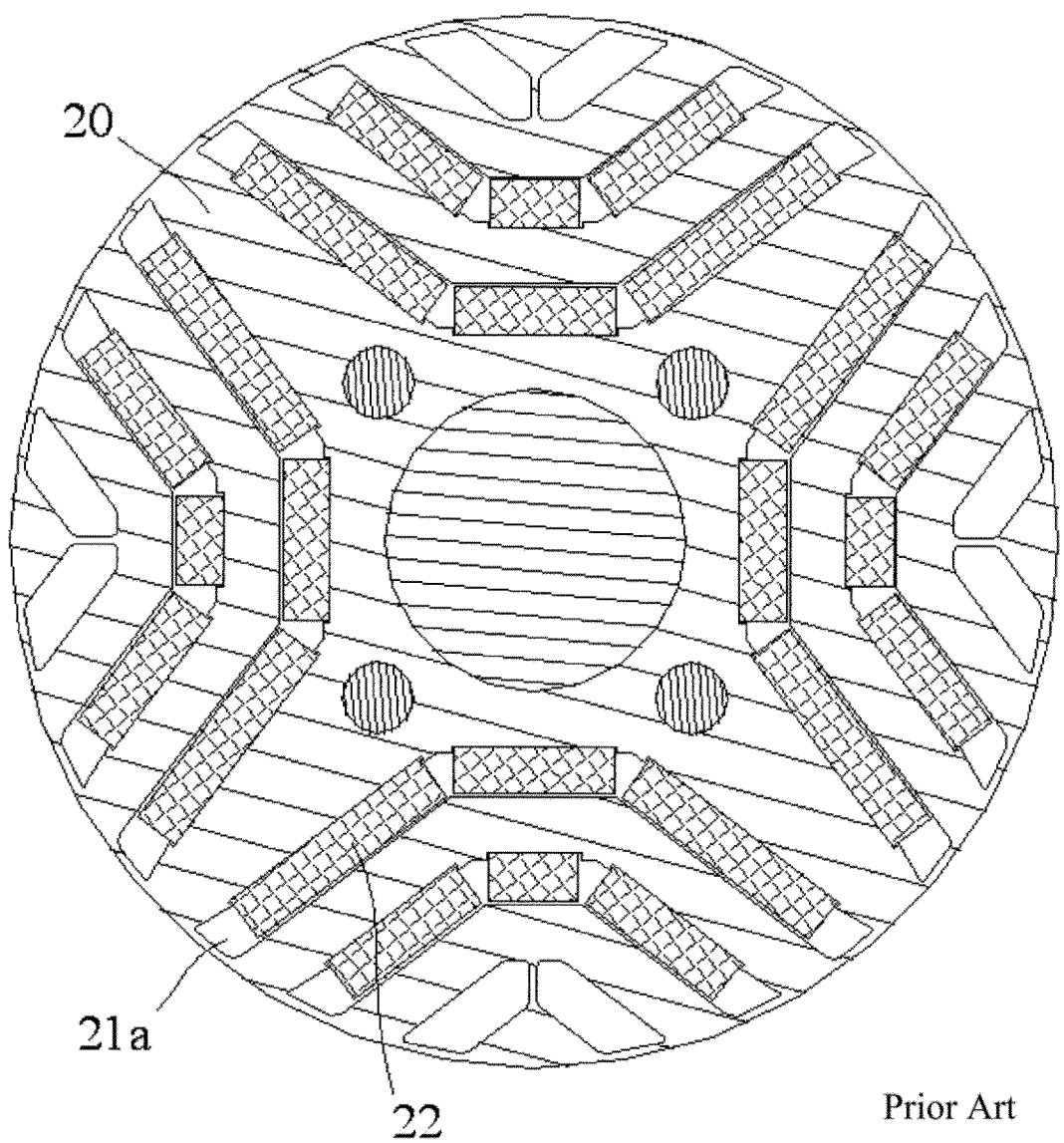
Figure 3:
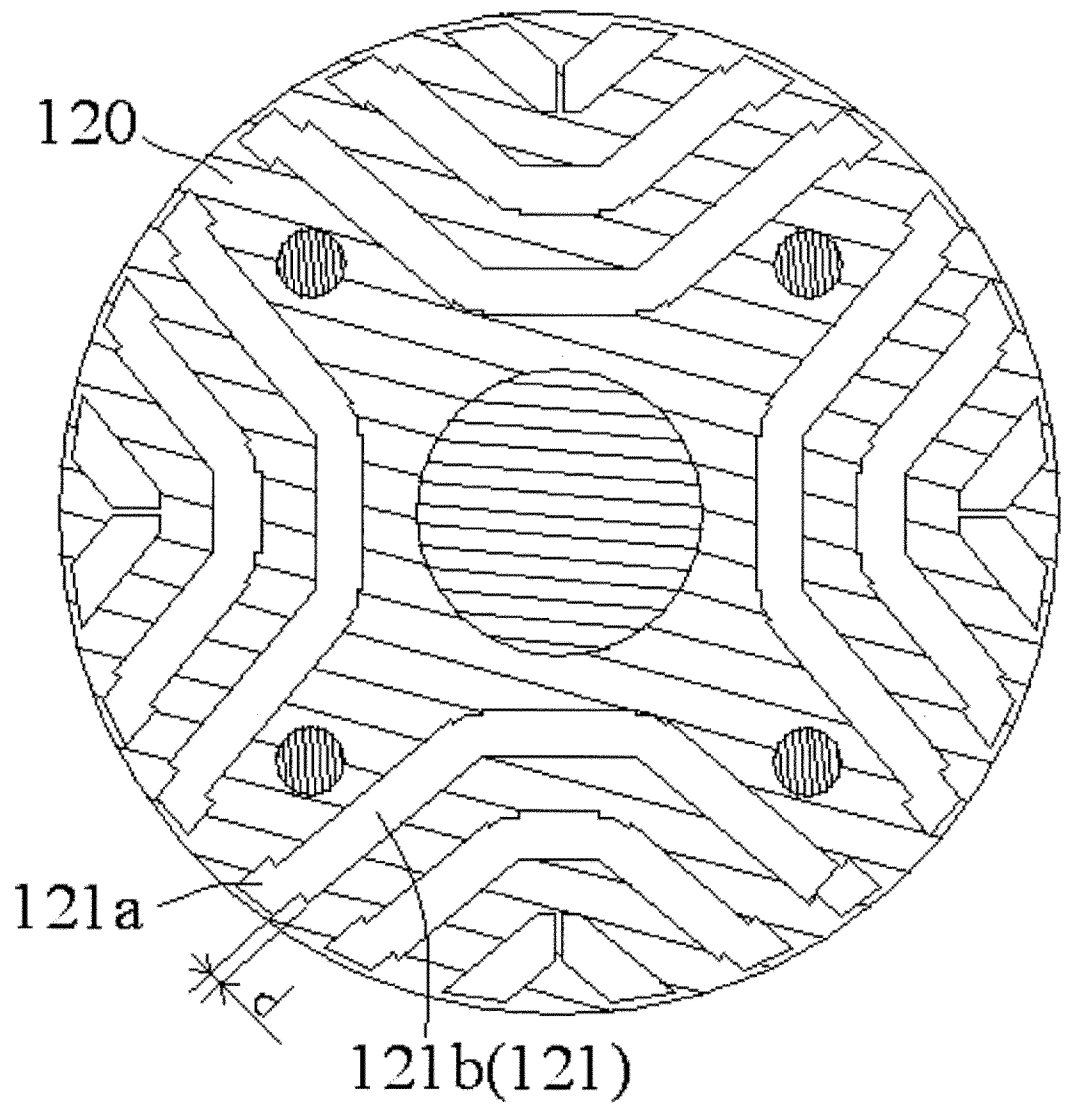
Figure 4:
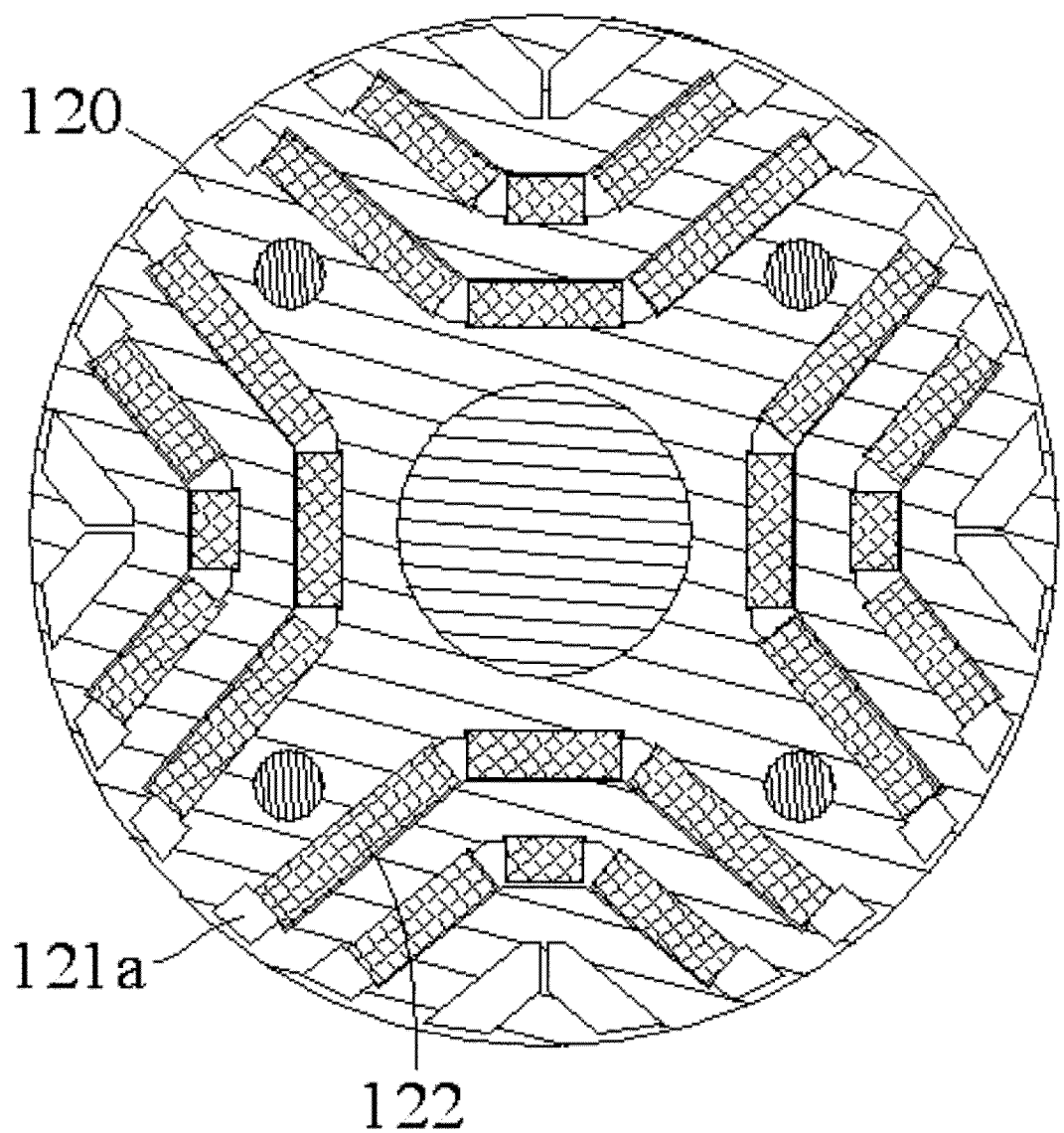
Figure 5:
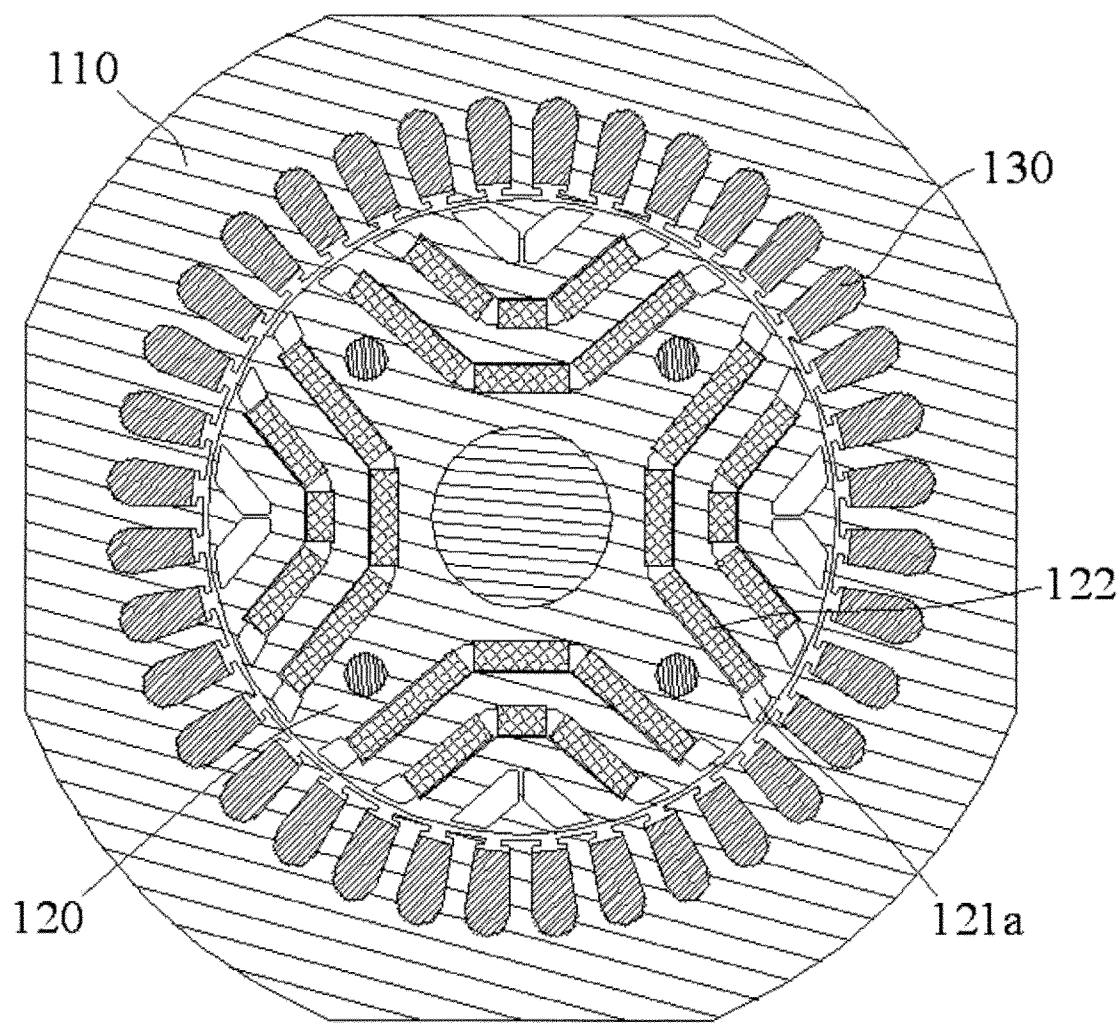
Figure 6:
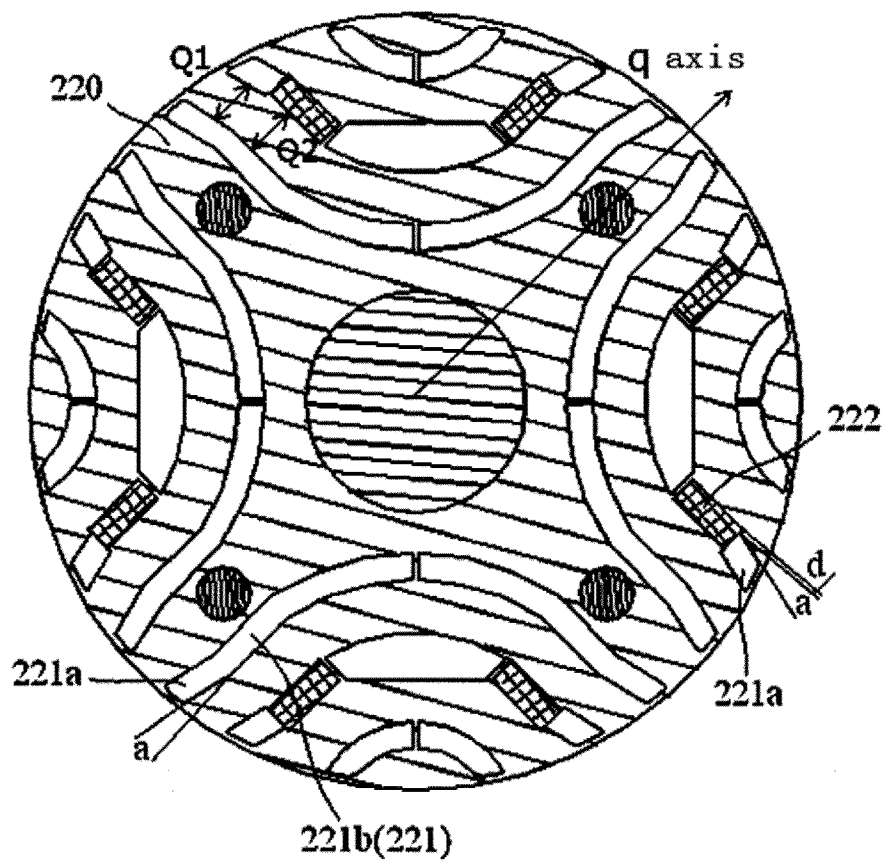
Figure 7:
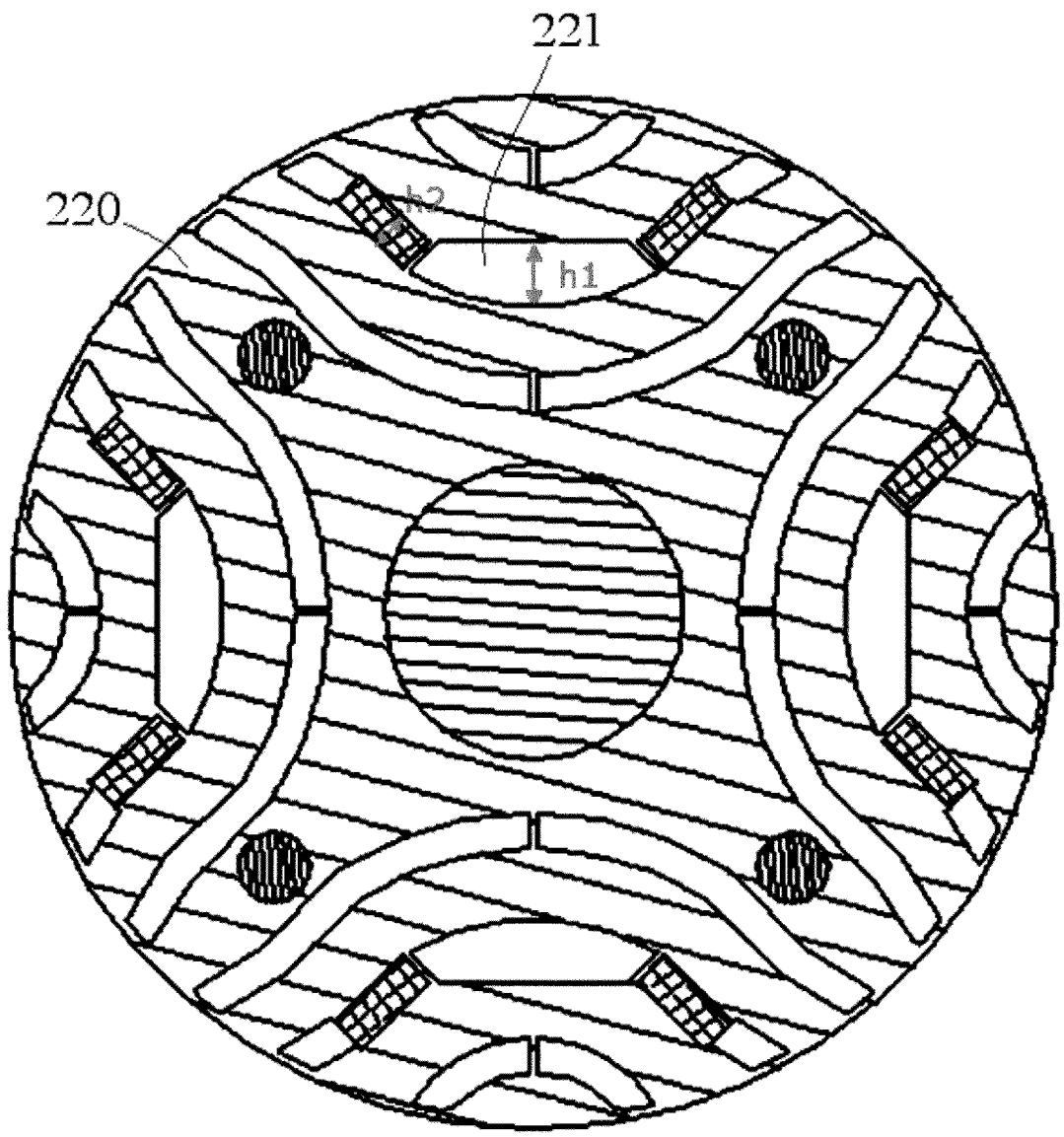
Figure 8:
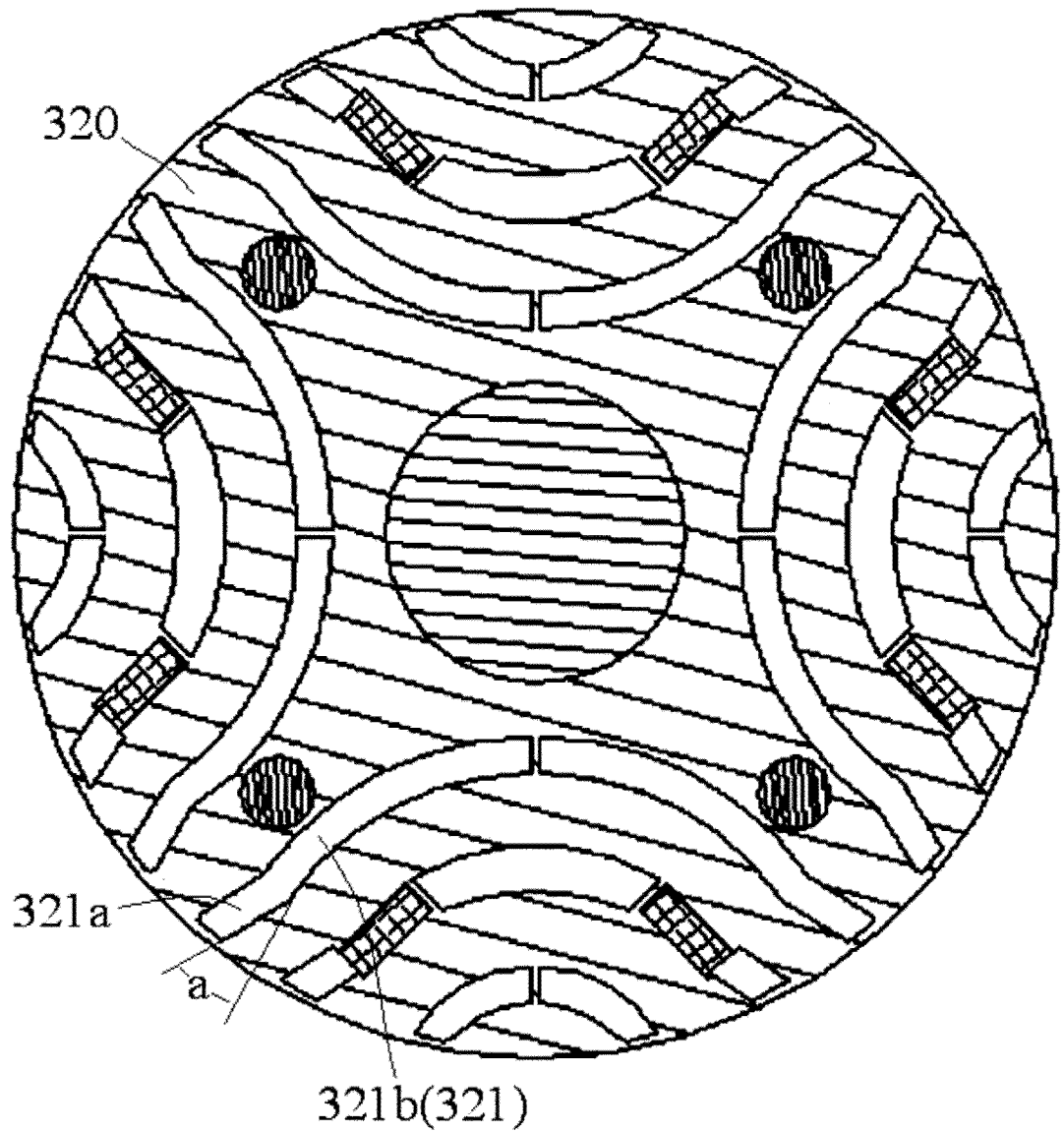
Figure 9:
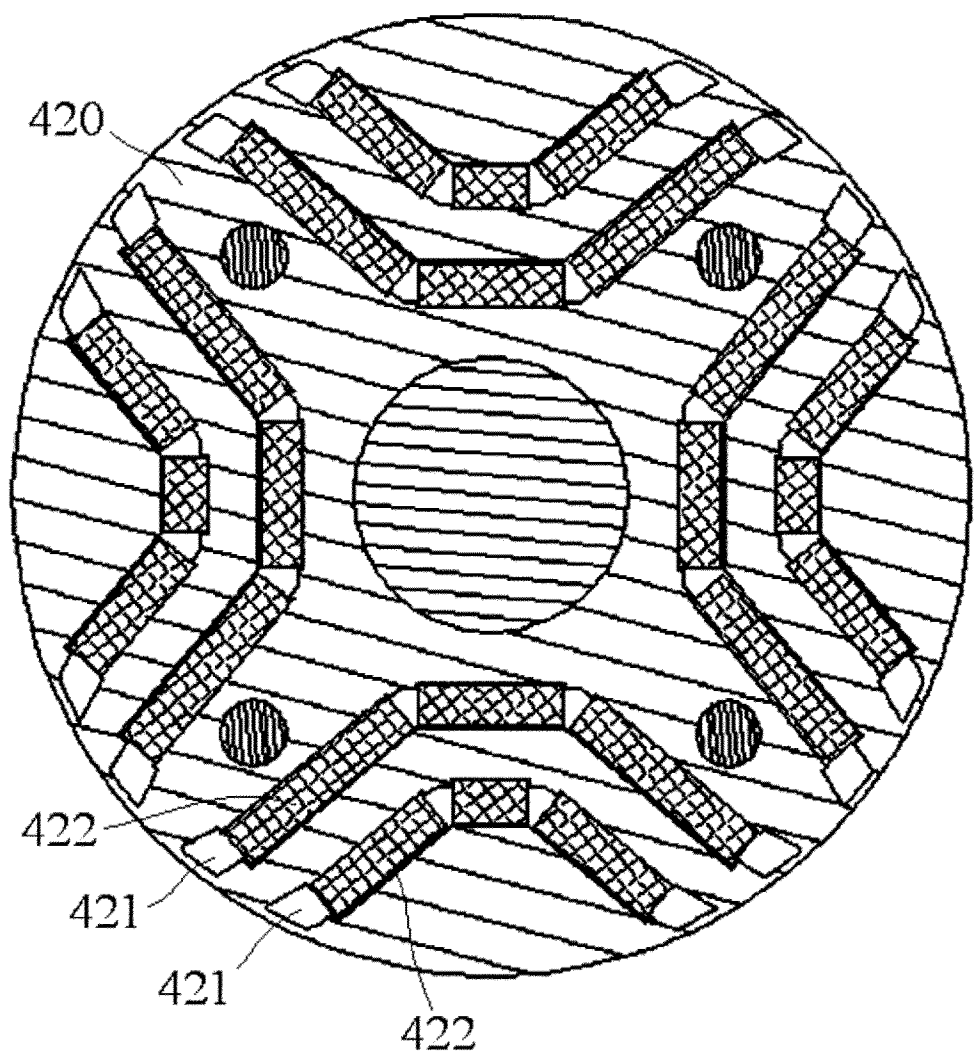
Figure 10:
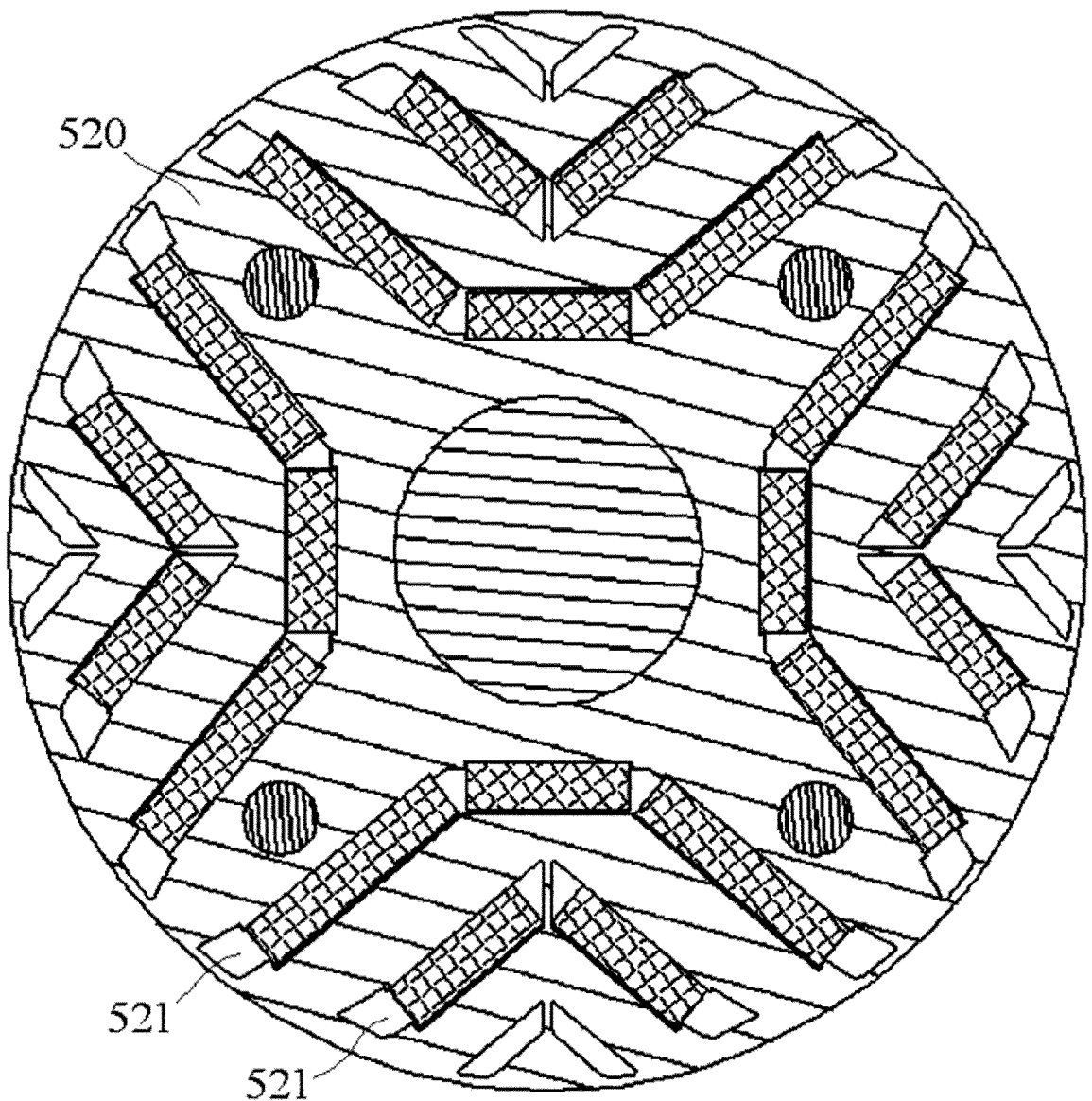
Figure 11:
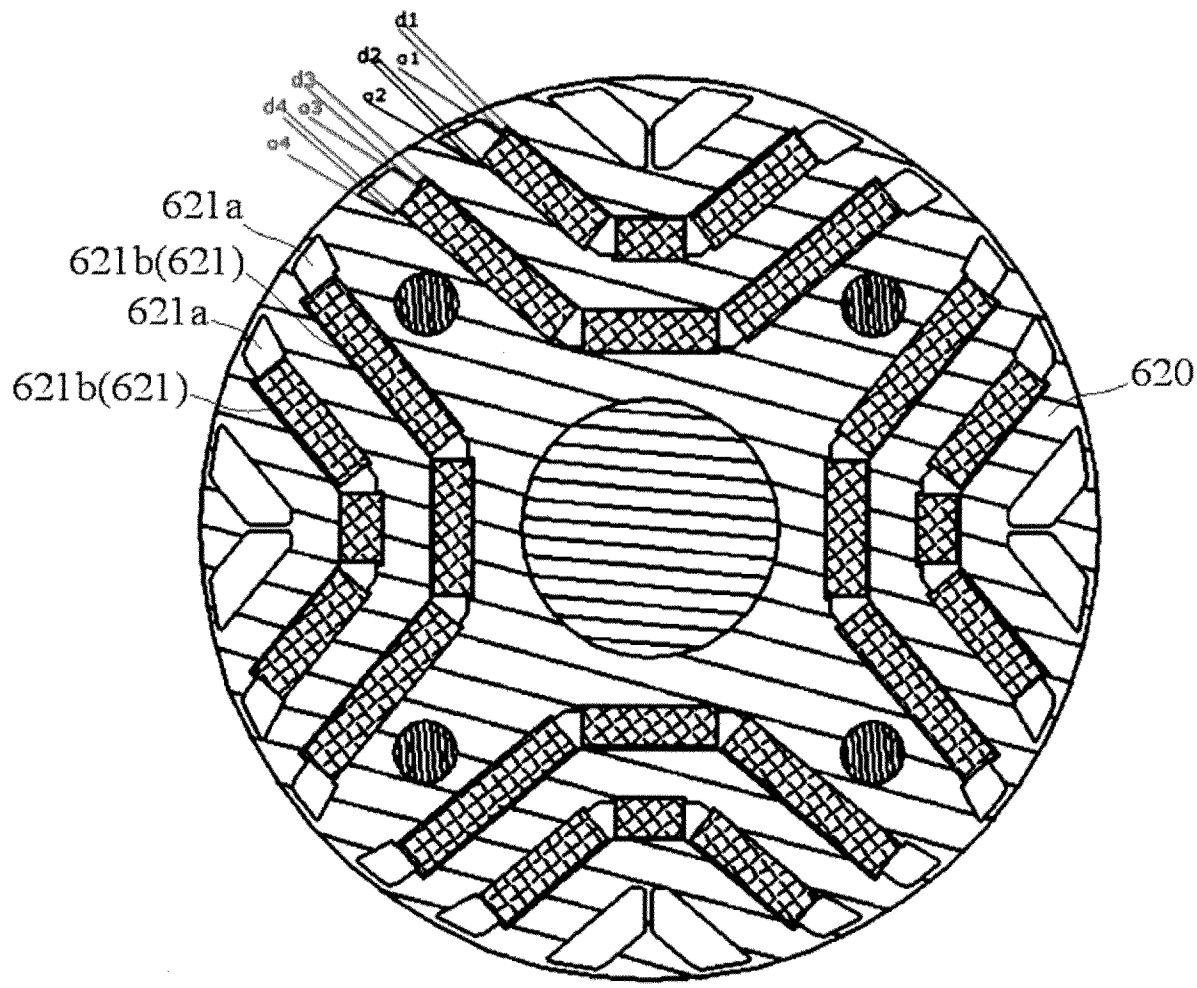
Figure 12:
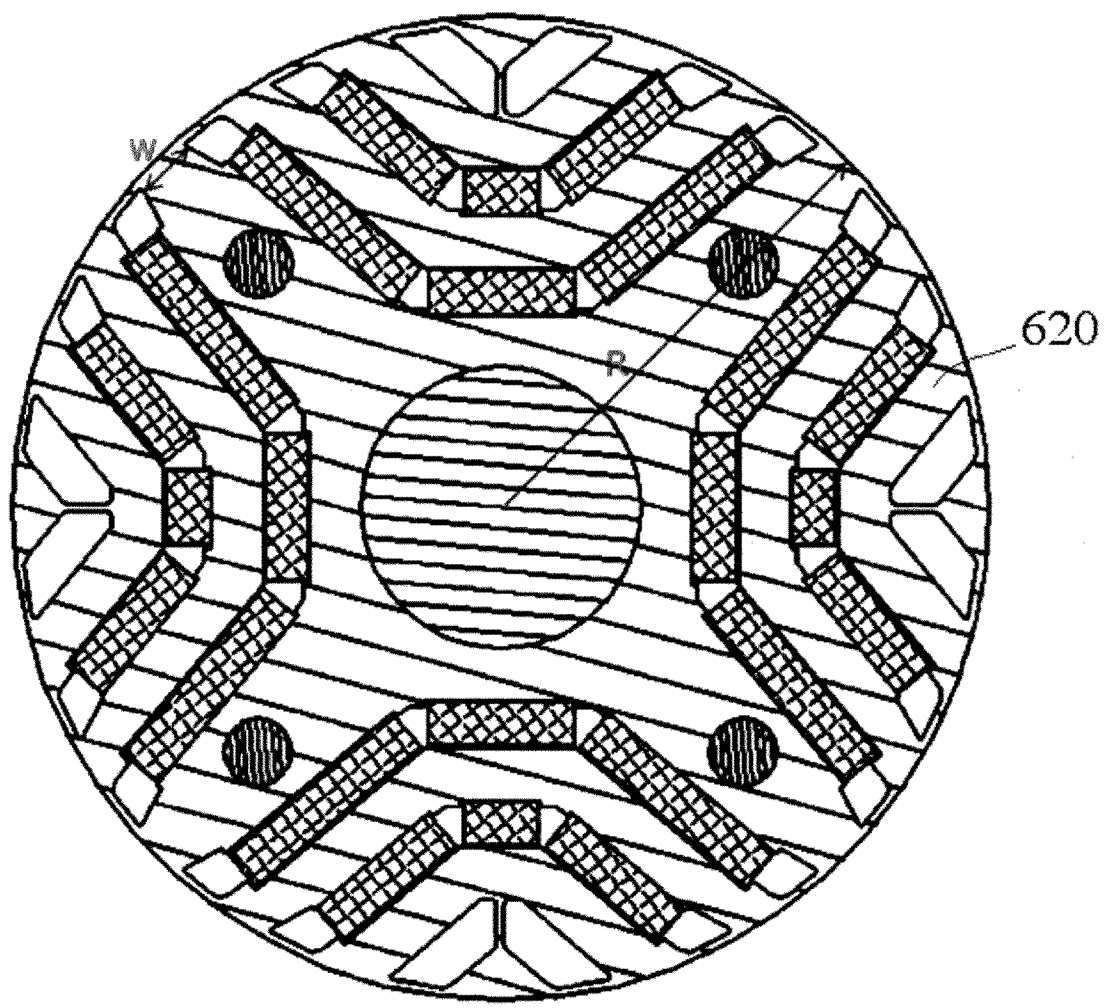
Figure 13:
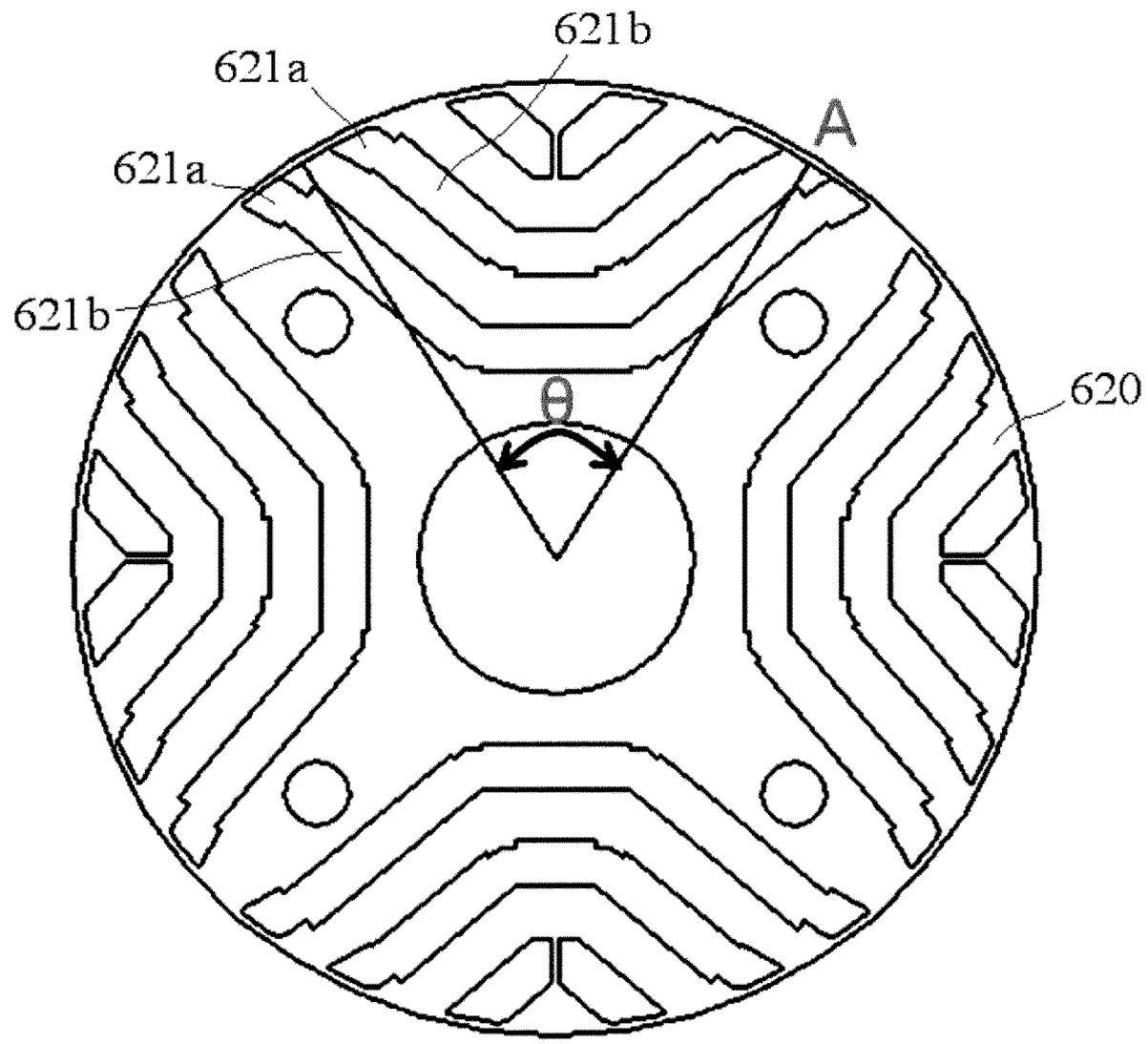
Figure 14:
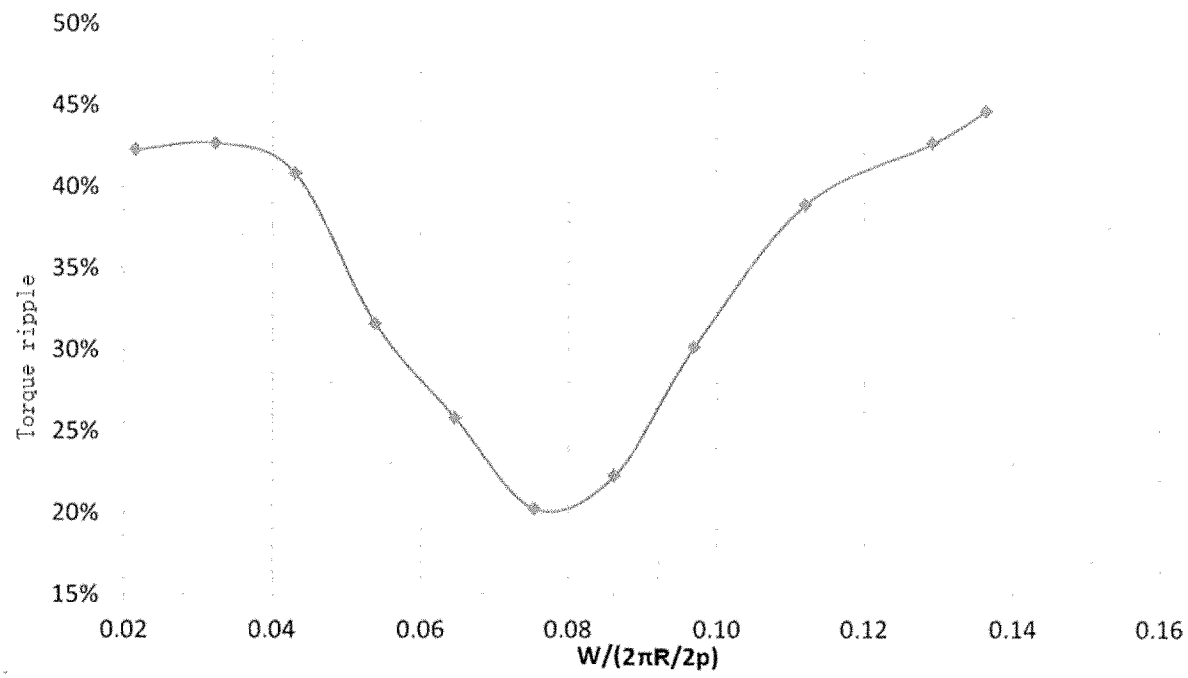
Figure 15:
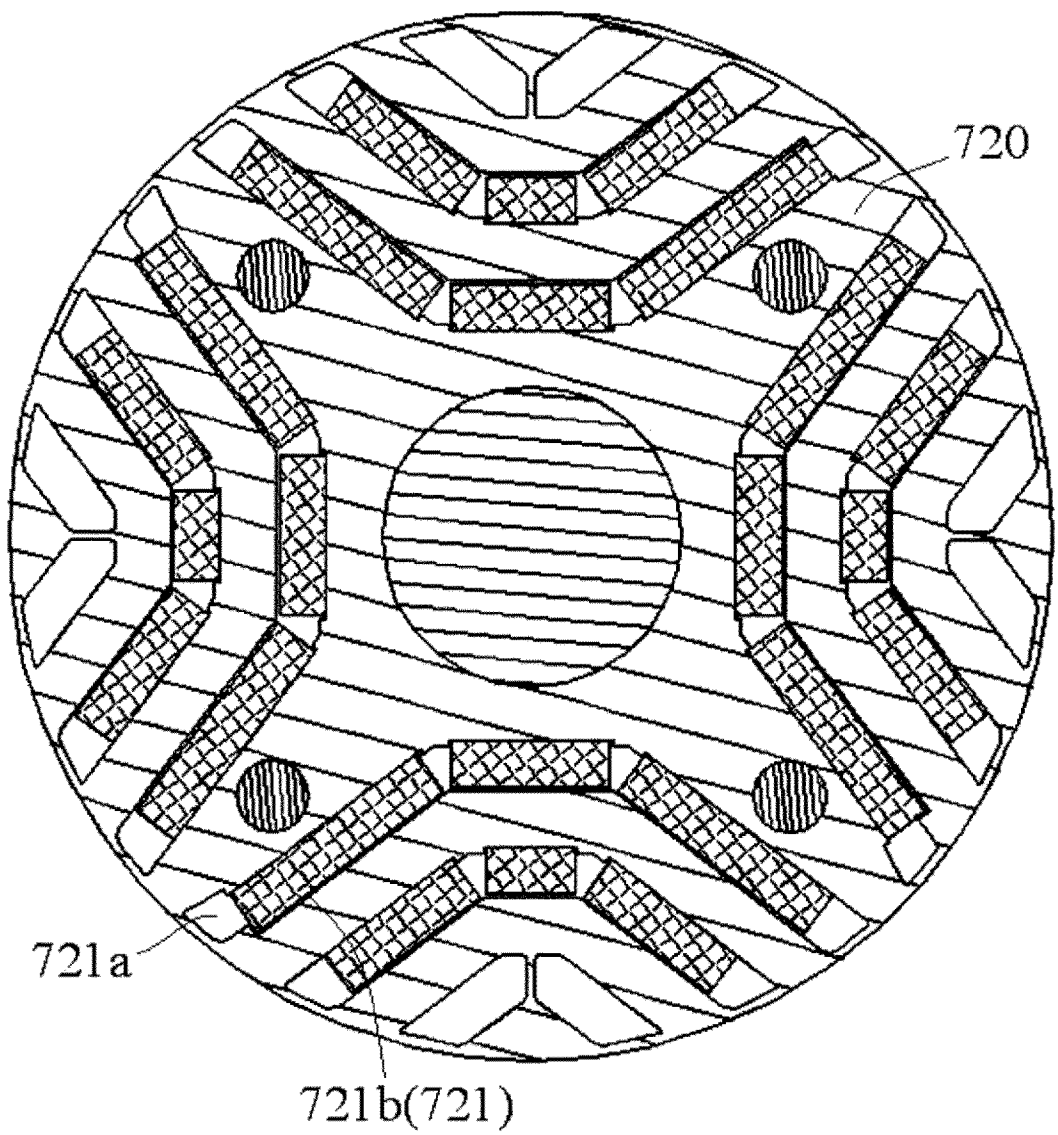
Figure 16:
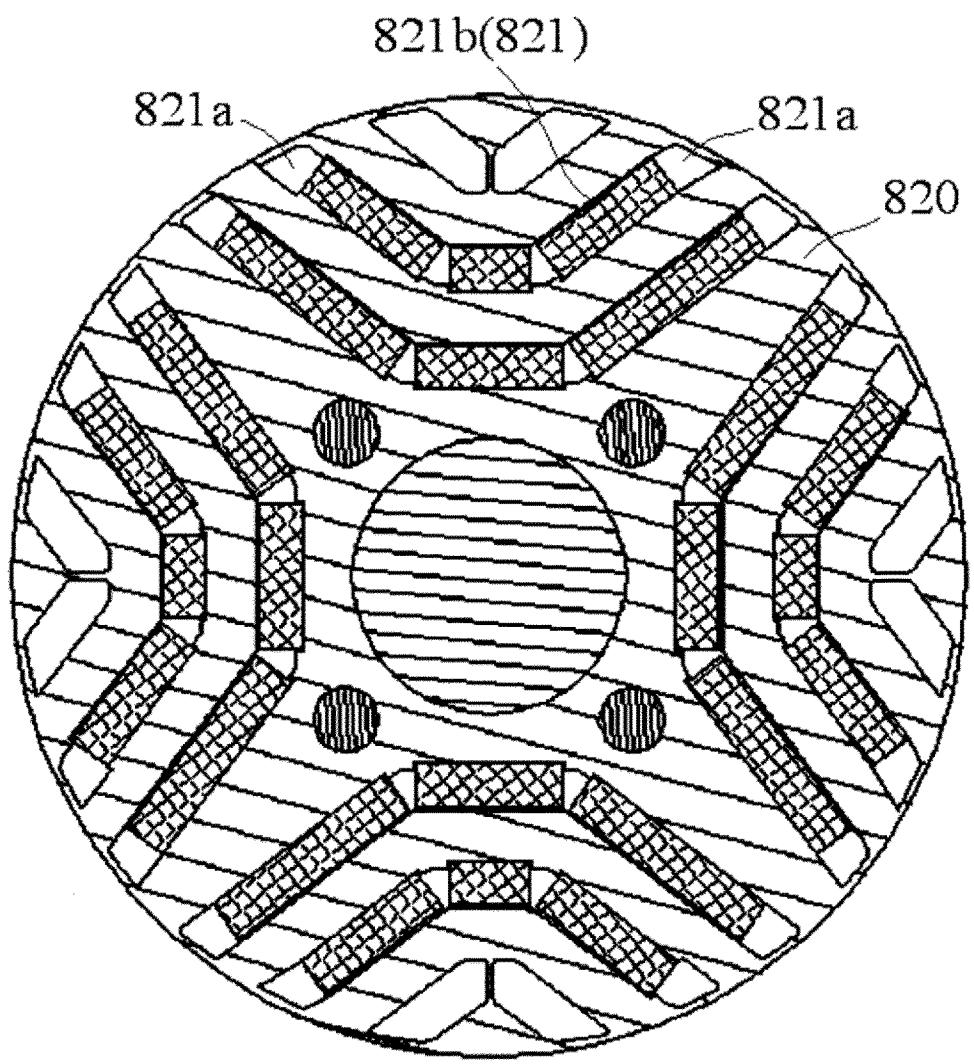
Figure 17:
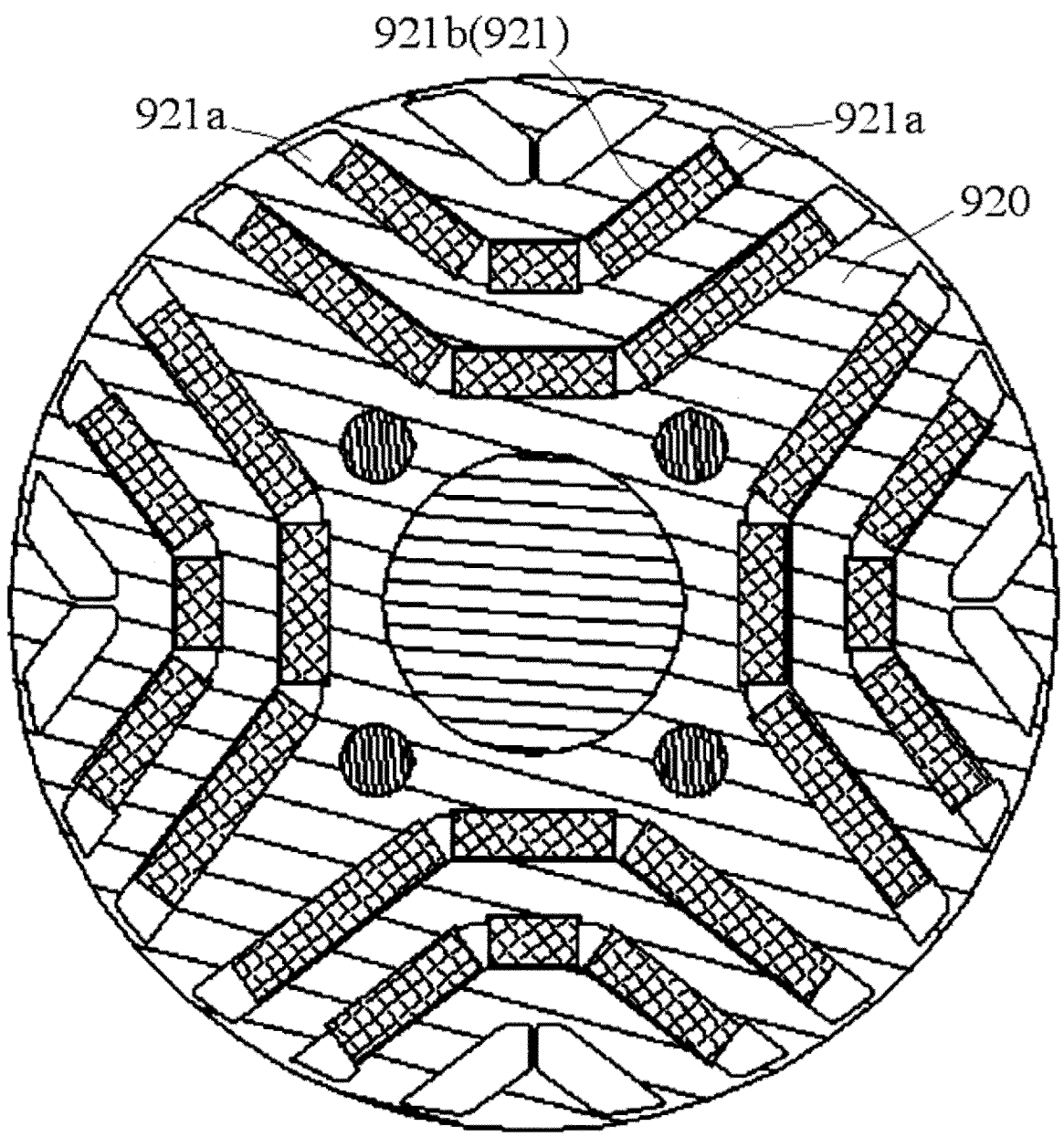
Figure 18:
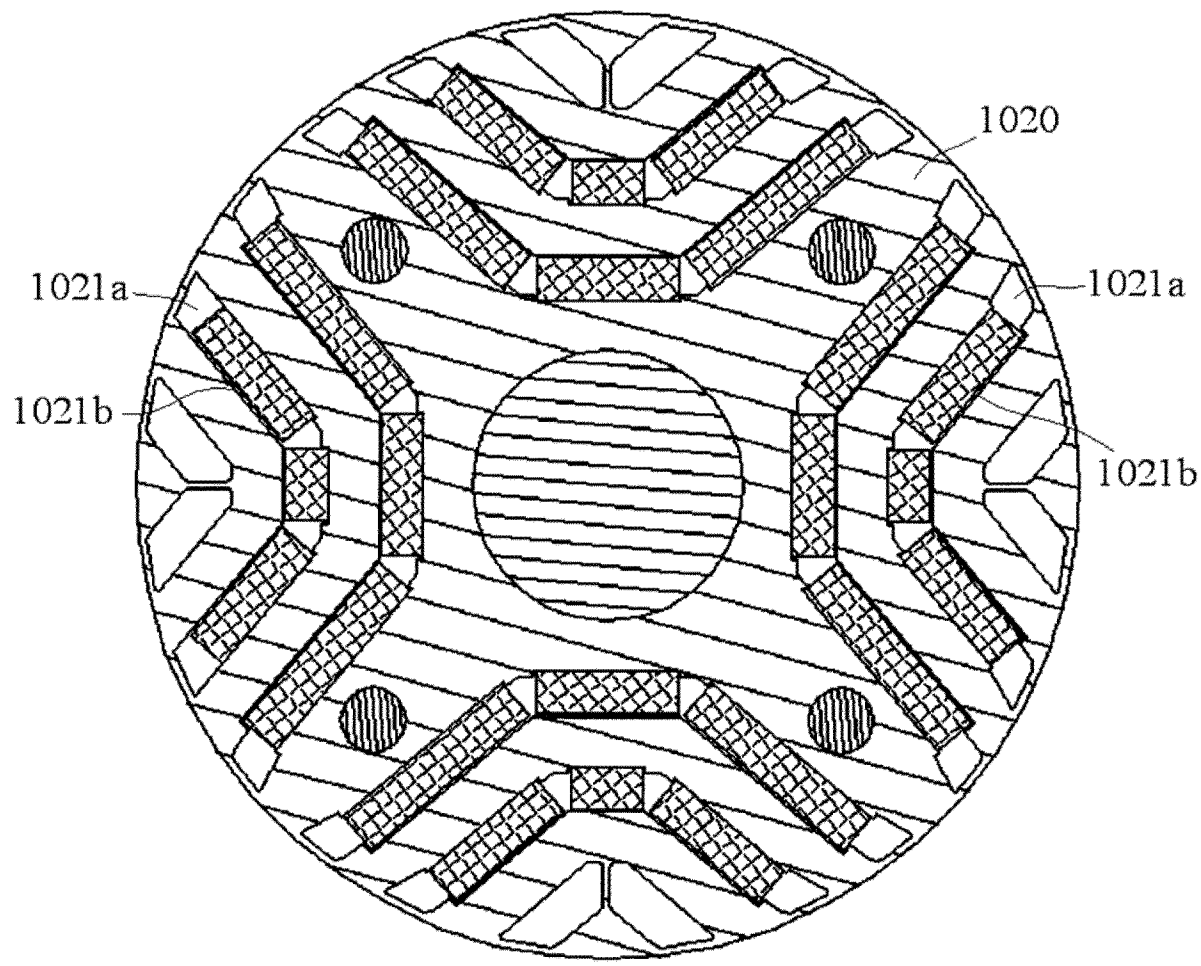
Figure 19:
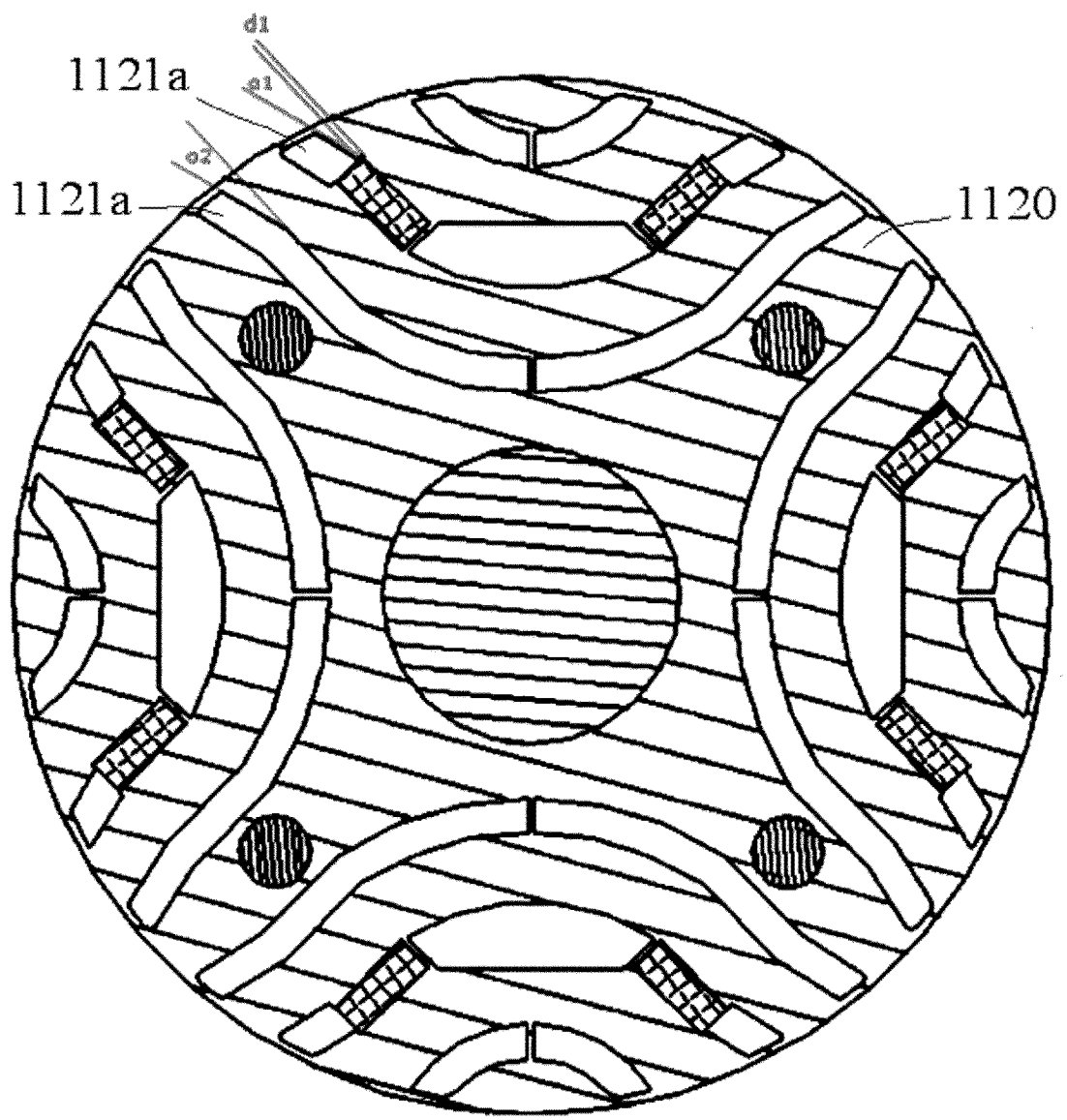

FIG. 19 shows a schematic diagram of a rotor 1120 of a reluctance motor according to an eleventh embodiment of the present invention, where magnetic filler is filled in air-gap slots 1121 of the rotor 1120.

The eleventh embodiment shown in FIG. 19 differs from the first embodiment shown in FIGS. 3 and 4 in the structure of an air-gap slot.

In the eleventh embodiment shown in FIG. 19, both end parts 1121*a* of a middle air-gap slot 1121 have an offset with a first offset distance d1 and a first offset angle α1. Both end parts 1121*a* of an innermost air-gap slot 1121 have an offset only with a second offset angle α2.

In the embodiment, the first offset angle α1 may be equal or unequal to the second offset angle α2.

Embodiment 12

Figure 20:
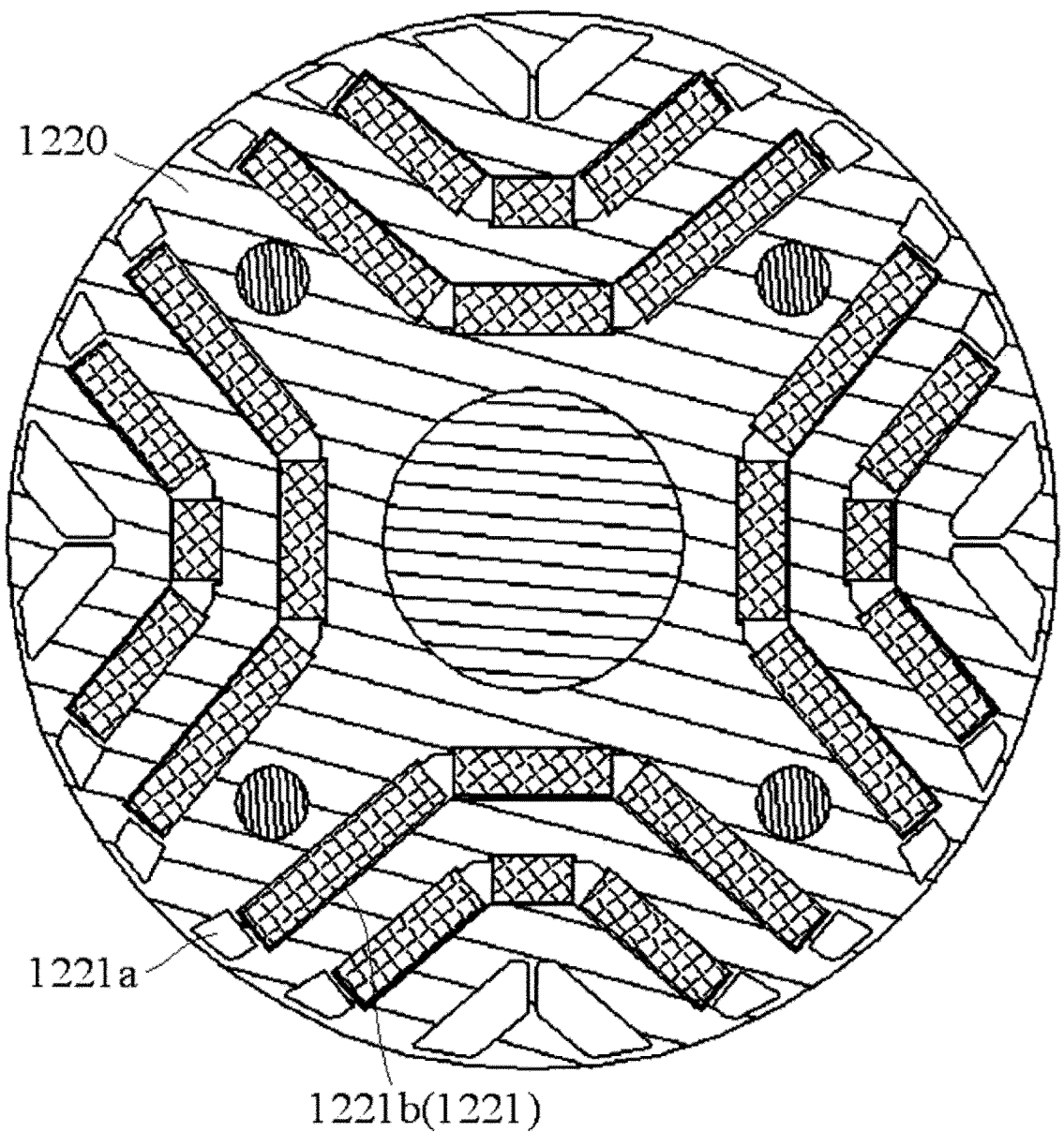
FIG. 20 shows a schematic diagram of a rotor of a reluctance motor according to a twelfth embodiment of the present invention, where magnetic filler is filled in air-gap slots of the rotor.

FIG. 20 shows a schematic diagram of a rotor 1220 of a reluctance motor according to a twelfth embodiment of the present invention, where magnetic filler is filled in air-gap slots 1221 of the rotor 1220.

The twelfth embodiment shown in FIG. 20 differs from the first embodiment shown in FIGS. 3 and 4 in the structure of an air-gap slot.

In the twelfth embodiment shown in FIG. 20, end parts 1221*a* of a middle air-gap slot 1221 are disconnected from their corresponding main body part 1221*b*, and are spaced apart by a predetermined distance; similarly, end parts 1221*a* of an innermost air-gap slot 1221 are disconnected from their corresponding main body part 1221b, and are spaced apart by a predetermined distance. The predetermined distance is more than or equal to 0.5 mm and less than or equal to 0.8 mm. Thus, it can ensure sufficient mechanical strength for the rotor. In addition, magnetic leakage can also be avoided.

The foregoing only provides some embodiments of the present invention, and persons of ordinary skill in the art shall understand that changes may be made to these embodiments without departing from the principle of the general inventive concept; the scope of the present invention is defined by the claims and their equivalents.

It should also to be noted that the word "comprising/comprise" does not exclude other elements or steps, and the word "a" or "an" does not exclude a plurality. In addition, any reference signs to the elements of the claims should not be construed as a limitation to the scope of the invention.

What is claimed is:

1. A motor, comprising:
a stator, and
a rotor, which is arranged within the stator;
wherein an end part of at least one air-gap slot of the rotor has a translation dislocation with a predetermined distance and/or a predetermined angle relative to a main body part adjacent immediately to the end part, and the translation dislocation has the same width with the air-gap slot.

2. The motor of claim 1, wherein
the rotor comprises multiple groups of air-gap slots, the multiple groups being separately distributed around a center of the rotor;
wherein each group of air-gap slots comprises multiple air-gap slots which are arranged separately along a radial direction of the rotor.

3. The motor of claim 2, wherein
at least one end part of at least one air-gap slot in said each group of air-gap slots has an offset with a predetermined distance and/or a predetermined angle relative to a main body part of said at least one air-gap slot.

4. The motor of claim 3, wherein
end parts of any air-gap slot in said each group of air-gap slots, except for an air-gap slot located at the outmost in the radial direction of the rotor, have an offset with a predetermined distance and/or a predetermined angle relative to a corresponding main body part of said any air-gap slot.

5. The motor of claim 4, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 \le W/(2\pi R/2p) \le 0.09$.

6. The motor of claim 3, wherein
the at least one end part of the at least one air-gap slot in said each group of air-gap slots has the offset in a direction towards or away from an adjacent group of air-gap slots.

7. The motor of claim 6, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 W/(2\pi R/2p) \le 0.09$.

8. The motor of claim 3, wherein
the at least one air-gap slot is approximately U-shaped, V-shaped or circular arc-shaped; or,
each air-gap slot in said each group of air-gap slots has a same shape or different shapes; or,
the rotor comprises four, six or eight groups of air-gap slots; or,
said each group of air-gap slots comprises two or three air-gap slots, the two or three air-gap slots being separately arranged along the radial direction of the rotor.

9. The motor of claim 8, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 \le W/(2\pi R/2p) \le 0.09$.

10. The motor of claim 3, wherein
a first end part of a first air-gap slot in said each group of air-gap slots has translation dislocation distance or translation dislocation angle equal to or different from a translation dislocation distance or translation dislocation angle that a second end part of a second air-gap slot in said each group of air-gap slots has; or,
the first end part of the first air-gap slot in said each group of air-gap slots has a translation dislocation direction the same as or different from a translation dislocation direction that the second end part of the second air-gap slot in said each group of air-gap slots has; or,
two end parts of a same air-gap slot have a same translation dislocation distance or angle, or different translation dislocation distances or angles; or,
the two end parts of the same air-gap slot have a same offset direction or different translation dislocation directions; or,
two adjacent groups of air-gap slots are symmetrical or asymmetrical to each other; or,
an end part of an air-gap slot in one of the two adjacent groups has a translation dislocation distance or angle the same as or different from a translation dislocation distance or angle that a corresponding end part of a corresponding air-gap slot in the other of the two adjacent groups has; or,
the end part of the air-gap slot in one of the two adjacent groups has a translation dislocation direction the same as or different from a translation dislocation direction that the corresponding end part of the corresponding air-gap slot in the other of the two adjacent groups has.

11. The motor of claim 3, wherein
the end part of the at least one air-gap slot is connected with the main body part adjacent immediately to the end part or is spaced apart by a predetermined distance from the main body part adjacent immediately to the end part; wherein the predetermined distance is more than or equal to 0.5 mm and less than or equal to 0.8 mm.

12. The motor of claim 3, wherein
the main body part adjacent immediately to the end part of the at least one air-gap slot extends along an arc-shaped line, and the end part has the offset with the predetermined distance and/or predetermined angle relative to a tangent line of an edge part of the arc-shaped line of the main body part adjacent immediately to the end part.

13. The motor of claim 3, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 \leq W/(2\pi R/2p) \leq 0.09$.

14. The motor of claim 2, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 W/(2\pi R/2p) \leq 0.09$.

15. The motor of claim 14, wherein
the maximum electrical degree θ of an included angle between a first line and a second line meets a relation of 124°≤θ≤140°, wherein the first line is between a center point of an end part of a magnetic flux path of the rotor and an axial center point of the rotor, and the second line is between a center point of the other end part of the magnetic flux path of the rotor and the axial center point of the rotor.

16. The motor of claim 1, wherein
magnetic filler is filled in at least one air-gap slot of the rotor.

17. The motor of claim 16, wherein
one or more pieces of the magnetic filler is/are filled in a same air-gap slot.

18. The motor of claim 17, wherein
the magnetic filler is a ferrite magnet containing a rare earth element and/or sintered neodymium-iron-boron permanent magnet.

19. The motor of claim 17, wherein
the motor is a motor applicable to a variable speed compressor.

20. The motor of claim 1, wherein
a distance (W) between respective vertexes of two end parts of respective innermost air-gap slots in two adjacent groups of air-gap slots, a radius (R) of the rotor and the number (2p) of said groups of air-gap slots meet a relation:

$0.065 \leq W/(2\pi R/2p) \leq 0.09$.

* * * * *

UNITED STATES PATENT AND TRADEMARK OFFICE
CERTIFICATE OF CORRECTION

PATENT NO.         : 10,658,891 B2
APPLICATION NO.    : 15/392083
DATED              : May 19, 2020
INVENTOR(S)        : Wanzhen Liu et al.

It is certified that error appears in the above-identified patent and that said Letters Patent is hereby corrected as shown below:

On the Title Page

Under abstract "20 Claims, 19 Drawing Sheets" should read -- 20 Claims, 20 Drawing Sheets --

In the Drawings

Please replace FIGS. 1-19 with FIGS. 1-20 as shown on the attached pages

In the Claims

Column 11, Claim 7, Line 67, please replace "0.065 W/(2πR/2p)≤0.09." with
-- 0.065≤W/(2πR/2p)≤0.09. --

Column 13, Claim 14, Line 14, please replace "0.065 W/(2πR/2p)≤0.09." with
-- 0.065≤W/(2πR/2p)≤0.09. --

Signed and Sealed this
Thirteenth Day of October, 2020

Andrei Iancu
*Director of the United States Patent and Trademark Office*